(12) United States Patent  
Alam et al.

(10) Patent No.: US 10,520,347 B2  
(45) Date of Patent: Dec. 31, 2019

(54) MEASURING CUP

(71) Applicant: KING SAUD UNIVERSITY, Riyadh (SA)

(72) Inventors: Mohd Aftab Alam, Riyadh (SA); Fahad Ibrahim Al-Jenoobi, Riyadh (SA); Abdullah M. Al-Mohizea, Riyadh (SA)

(73) Assignee: King Saud University, Riyadh (SA)

( * ) Notice: Subject to any disclaimer, the term of this patent is extended or adjusted under 35 U.S.C. 154(b) by 0 days.

(21) Appl. No.: 16/202,950

(22) Filed: Nov. 28, 2018

(65) Prior Publication Data

US 2019/0145811 A1    May 16, 2019

Related U.S. Application Data

(62) Division of application No. 15/186,399, filed on Jun. 17, 2016, now Pat. No. 10,209,116.

(51) Int. Cl.
| | |
|---|---|
| *G01F 19/00* | (2006.01) |
| *G01F 23/32* | (2006.01) |
| *G01F 23/64* | (2006.01) |
| *G01F 23/20* | (2006.01) |

(52) U.S. Cl.
CPC ............ *G01F 19/00* (2013.01); *G01F 23/205* (2013.01); *G01F 23/32* (2013.01); *G01F 23/64* (2013.01)

(58) Field of Classification Search
CPC ....................................... G01F 19/00
USPC .......................................... 73/426, 427, 428
See application file for complete search history.

(56) References Cited

U.S. PATENT DOCUMENTS

| | | | |
|---|---|---|---|
| 62,866 A | 3/1867 | McCann |
| 193,761 A | 7/1877 | Healy |
| 423,018 A | 3/1890 | Young |
| 494,467 A | 3/1893 | Donathen |
| 662,273 A | 11/1900 | Finkelbein |

(Continued)

OTHER PUBLICATIONS

Website, http://www.oxo.com/products/preparing/measuring/2-cup-adjustable-measuring-cup, seven pages printed from the Internet on Nov. 7, 2015.

(Continued)

*Primary Examiner* — Jamel E Williams  
(74) *Attorney, Agent, or Firm* — Richard C. Litman; Nath, Goldberg & Meyer

(57) ABSTRACT

The measuring cup includes numerous embodiments configured for a user to precisely determine the cup contents without need to lift the cup to one's eye level or to lower the eye level to the level of the cup contents. The various embodiments include folding cups; cups having transparent passages in the wall; cups having adjustably positionable bottoms; cups having level indicator rods in the cup interior extending upward from the cup bottom; cups having one or more filaments extending across the cup interior; cups having rigid level indicators spanning the cup interior; cups having adjustably positionable level indicator tabs therein; cups having buoyant level indicator tabs adjustably positionable in the cup interior; and cups having removable clip-on scales extending down along the interior of the cup wall, the scales having a plurality of attachment points for the removable attachment of a level indicator tab at a desired attachment point.

6 Claims, 14 Drawing Sheets

(56) References Cited

U.S. PATENT DOCUMENTS

| | | | |
|---|---|---|---|
| 678,325 A | 7/1901 | White | |
| 703,097 A | 6/1902 | Strout | |
| 792,380 A | 6/1905 | Albo | |
| 923,618 A | 6/1909 | Blizard | |
| 1,168,027 A | 1/1916 | Nirdlinger | |
| 1,564,470 A | 12/1925 | Crimmel | |
| 1,602,937 A | 10/1926 | Rieff | |
| 1,683,191 A | 9/1928 | Huntley | |
| 1,744,328 A | 1/1930 | Morley | |
| 2,204,730 A * | 6/1940 | Eskilson | G01F 19/005 73/429 |
| 2,328,995 A * | 9/1943 | Olds | G01F 19/005 222/386 |
| 2,329,437 A | 9/1943 | Corwin | |
| 2,478,272 A * | 8/1949 | Jennings | G01F 19/00 222/44 |
| 2,479,007 A * | 8/1949 | Gruben | G01F 19/005 73/429 |
| 2,551,002 A * | 5/1951 | Jennings | G01F 19/00 222/386 |
| 2,583,808 A | 1/1952 | Bernhardt | |
| 2,625,044 A | 1/1953 | Christie | |
| 2,625,824 A | 1/1953 | Moe | |
| 2,642,744 A | 6/1953 | Thomas | |
| 2,758,771 A | 8/1956 | Bauer | |
| 2,801,541 A | 8/1957 | Moreland | |
| 2,839,928 A * | 6/1958 | Fohrman | G01F 19/005 249/155 |
| 2,931,230 A | 4/1960 | Lowery | |
| 3,712,139 A | 1/1973 | Harvey | |
| 4,488,432 A | 12/1984 | Bang | |
| 4,986,464 A | 1/1991 | Leigh | |
| 5,397,036 A | 3/1995 | Maiwald | |
| 5,447,245 A | 9/1995 | Merhar | |
| 6,026,685 A * | 2/2000 | Weterrings | G01F 19/00 220/8 |
| D440,501 S * | 4/2001 | Dorion | D10/46.2 |
| 6,283,732 B1 | 7/2001 | Hoeting et al. | |
| 6,375,031 B1 * | 4/2002 | Kwan | G01F 19/00 215/365 |
| 6,546,794 B2 * | 4/2003 | Kim | B41J 2/17513 73/290 V |
| 7,658,106 B2 * | 2/2010 | Price | G01F 19/00 222/158 |
| 7,882,737 B2 | 2/2011 | Coats et al. | |
| 8,210,380 B2 * | 7/2012 | Jin | B65F 1/02 206/761 |
| 8,225,956 B1 * | 7/2012 | LeBlanc | A47J 43/27 206/459.1 |
| 8,382,730 B2 | 2/2013 | Tauer | |
| 2001/0042402 A1 | 11/2001 | Hoeting et al. | |
| 2005/0011261 A1 | 1/2005 | Lyon | |
| 2006/0016257 A1 | 1/2006 | Bang | |
| 2006/0032855 A1 * | 2/2006 | Hinkle | A47G 19/2205 220/703 |
| 2007/0227245 A1 * | 10/2007 | Green | A47G 19/12 73/428 |
| 2009/0056440 A1 * | 3/2009 | Vendl | G01F 19/00 73/429 |
| 2009/0173153 A1 | 7/2009 | Barton | |
| 2009/0255333 A1 | 10/2009 | Henry et al. | |
| 2009/0302068 A1 * | 12/2009 | Schneider | G01F 11/12 222/344 |
| 2010/0011855 A1 | 1/2010 | Yip | |
| 2011/0042255 A1 * | 2/2011 | Traboulsi | B65D 23/00 206/459.5 |
| 2013/0032592 A1 * | 2/2013 | Lee | A45F 3/20 220/8 |
| 2013/0313258 A1 * | 11/2013 | Sines | B65D 81/22 220/288 |
| 2019/0137318 A1 * | 5/2019 | Gill | G01F 23/04 |

OTHER PUBLICATIONS

Any identified foreign patents and/or publications were properly submitted in parent U.S. Appl. No. 15/186,399, filed Jun. 17, 2016, the priority of which is claimed.

* cited by examiner

MEASURING CUP

CROSS REFERENCE TO RELATED APPLICATIONS

This application is a division of Ser. No. 15/186,399, filed Jun. 17, 2016, now pending.

BACKGROUND OF THE INVENTION

1. Field of the Invention

The present invention relates generally to measuring devices and systems, and particularly to various embodiments of a measuring cup for liquids and other loose materials permitting the fill level to be precisely determined by viewing from above the level of the contents of the cup.

2. Description of the Related Art

Measuring cups and containers having indicia for indicating various quantities of contents therein have been known for a considerable period of time. Such measuring cups and containers are generally formed of glass or other transparent material with quantity indicia disposed along the outer surfaces thereof. While it is certainly possible to accurately determine the quantity of material within the cup, this can only be accomplished by lifting the container to one's eye level, or alternatively lowering the eye level to the level of the contents within the container.

Other measuring cups and containers formed of opaque materials have been provided in the past. These are generally provided in a limited number of different capacities, and a specific cup or container is required for each quantity desired. Certain other opaque containers have been provided with quantity indicia stamped or otherwise provided along the interior wall of the container, but it can be difficult to fill such cups or containers accurately to the desired quantity when the quantity is less than the total capacity of the container.

Thus, a measuring cup solving the aforementioned problems is desired.

SUMMARY OF THE INVENTION

The measuring cup includes a large number of embodiments, each permitting the cup contents to be viewed from above, rather than requiring the cup to be lifted to the eye level of the user or for the user to lower his or her line of sight to the level of the cup.

One group of embodiments comprises a folding cup wherein a plurality of fold lines is formed at different levels circumferentially about the cup. These lines permit the wall of the cup to be everted along a given line, thus lowering the upper edge of the wall and defining a volume according to the upper edge of the wall along the fold line. Quantity indicators can be provided at or near the fold lines for further reference. One of the folding cup embodiments includes a smaller container formed integrally with the bottom of the cup for measuring relatively small quantities. In another embodiment, the smaller container is detachable from the bottom of the cup.

Another group of embodiments includes transparencies in or through the wall of the cup, permitting the contents to be viewed as the contents flow into the transparencies. Some such embodiments include transparent horizontal tubes that communicate with the interior volume of the cup through passages in the wall of the cup. In one of these embodiments the tubes are permanently affixed to the cup, while in another embodiment a single removable tube is provided, the unused passages being plugged by removable plugs. In another embodiment, the removable tube can be installed vertically between passages. Still another embodiment includes a plurality of transparent windows in the cup wall, where unused windows are plugged or covered from the interior of the cup. Another embodiment includes a plurality of open ports through the wall of the cup, and a transparent window plug is installed in a selected one of the ports, the other ports being sealed by removable plugs.

Another group of embodiments includes an adjustably positionable bottom to adjust the internal volume of the cup. In one such embodiment, the height of the adjustable bottom is set by hand, while another adjustable bottom embodiment includes a compression spring urging the adjustable bottom upward while a tensile member (string, etc.) extends out through the lower portion of the cup to adjust the level of the adjustable bottom downward.

Another group of embodiments includes one or more level indicator rods extending upward from the bottom of the cup. One such embodiment includes a plurality of such indicator rods, each of a different height from the others to provide for measurement of different quantities in the cup. Another such embodiment has a single level indicator rod extending up from the bottom, the indicator rod comprising a plurality of removable segments to set the height of the uppermost segment. An uppermost segment can have an indicator tab thereon to more precisely indicate the desired level of the contents of the cup. In another embodiment, the level indicator tab is threaded onto a threaded rod extending up from the bottom of the cup. Yet another embodiment comprises a single rod extending up from the bottom of the cup, the rod having a flange extending radially therefrom, the flange having a series of notches therein. The level indicator tab includes a passage therethrough, the passage being congruent to the cross-sectional shape of the rod and flange. The tab is placed over the rod and rotated when aligned with one of the notches in the flange in order to set the height of the tab. In still another embodiment, the rod has a series of notches therein, and the level indicator tab has a slot that fits into any of the notches of the rod to set the height of the tab.

Another group of embodiments comprises one or more filaments (wire, thread, etc.) disposed across the interior of the cup. The filament(s) can be permanently installed in the cup, or can be removably attached by means of sockets that engage mating pins. The sockets can be provided on the ends of the filament(s) and the pins on the internal wall of the cup, or the pins can be provided on the ends of the filament(s) and the sockets in the wall of the cup.

In other embodiments, the cup can have a plurality of horizontally opposed sets of pins or rests extending inward from the inner wall. A level indicator includes a clip or clips on one or both ends. In one such embodiment, the level indicator has clips on both ends and is secured to horizontally opposed pins or rests extending from the inner surface of the cup wall. In another embodiment, a shorter indicator has a clip on only one end, and is cantilevered from one attachment point on the inner surface of the cup wall.

Another embodiment comprises a cup with a frustoconical exterior, the interior having a plurality of vertically spaced, circumferential steps therein. A corresponding plurality of level indicators is provided, the indicators being of different lengths corresponding to the horizontal span between the various step levels. A selected indicator is placed across the desired steps to indicate the desired level of contents in the cup.

Another group of embodiments comprises at least one level indicator tab that can be adjustably installed to any of a plurality of attachment points along the inner surface of the cup wall. The attachment points can comprise a plurality of sockets, the level indicator tab having a rod that plugs into the sockets, or the cup wall can have a plurality of pins while the indicator tab has a cooperating socket for removable installation to a selected pin. A plurality of such tabs can be provided, each having a quantity or level marked thereon.

Another group of embodiments has a level indicator comprising an attachment with a hinged rod extending therefrom. The rod includes a float thereon. The attachment end of the rod can be a pin for insertion into one of a plurality of sockets formed on the interior of the cup wall, or a socket to install on a cooperating pin extending inward from the cup wall.

Finally, another group of embodiments comprises a clip-on scale for removable attachment to the rim of the cup. The scale extends into the interior of the cup, and includes a plurality of attachment points for a level indicator tab. In one embodiment, the scale includes a plurality of sockets and the tab has a rod for removable installation in a selected one of the sockets. In another embodiment, the scale includes a plurality of pins, and the level indicator tab has a cooperating socket at the end of its arm.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
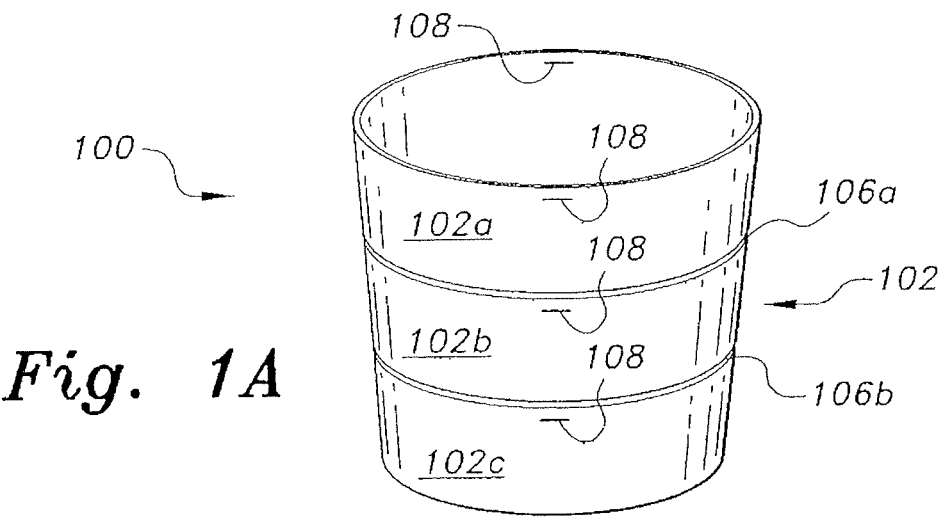
FIG. 1A is a perspective view of a first embodiment of a measuring cup according to the present invention, wherein the measuring cup can be folded circumferentially.

The measuring cup includes a plurality of embodiments, in which each embodiment enables a user of the cup to determine the quantity or volume contained within the cup without need to establish a horizontal sight line to the level in the cup. Thus, a user of any of the embodiments of the measuring cup may look down from above into the cup to determine the precise level or volume of the contents therein, without needing to lift the cup to his or her sight level or to lower his or her sight level to the level of the contents of the cup.

FIGS. 1A through 1D illustrate a first embodiment 100 of the measuring cup, wherein at least one portion of the peripheral wall 102 of the measuring cup 100 can be everted to lower the upper rim of the cup. The measuring cup 100 comprises a container having a peripheral wall 102 and a bottom 104 (shown in the elevation view in section of FIG. 1D), and at least one fold line disposed circumferentially about the wall 102. In the example of FIGS. 1A through 1D, upper and lower fold lines, respectively 106a and 106b, are provided. The two fold lines 106a and 106b define an upper wall portion 102a, an intermediate wall portion 102b, and a lower wall portion 102c. It will be seen that any desired number of additional fold lines can be provided, resulting in one more wall portion than the number of fold lines in each case. Corresponding quantity or level lines 108 can be provided along the wall 102 adjacent the fold lines 106a, 106b, and/or otherwise located. The quantity or level lines or marks 108 can be provided on the inner and/or outer surface of the cup wall 102 to quantify the volume of the cup 100 in the metric, English, or other system.

Figure 1B:
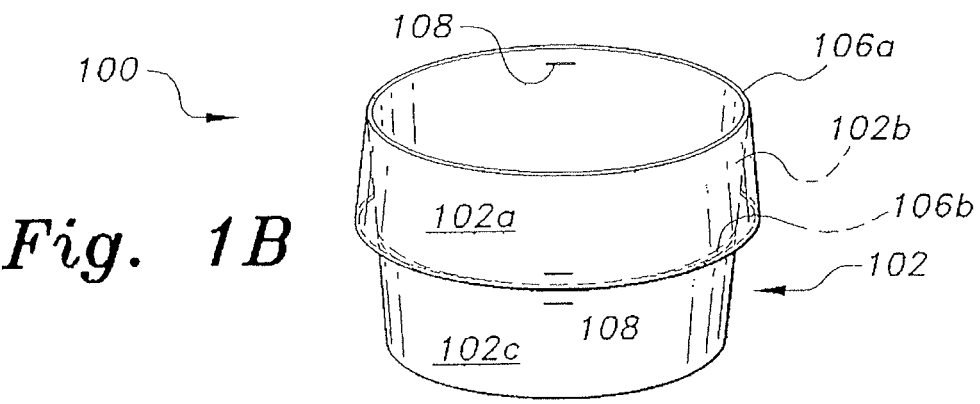
FIG. 1B is a perspective view of the measuring cup of FIG. 1A, showing the uppermost level everted.
Figure 1C:
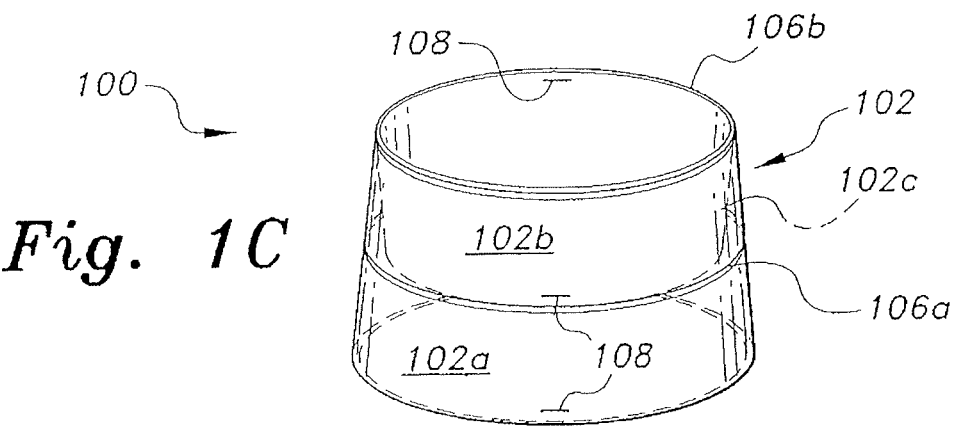
FIG. 1C is a perspective view of the measuring cup of FIGS. 1A and 1B, showing the uppermost and penultimate levels everted.
Figure 1D:
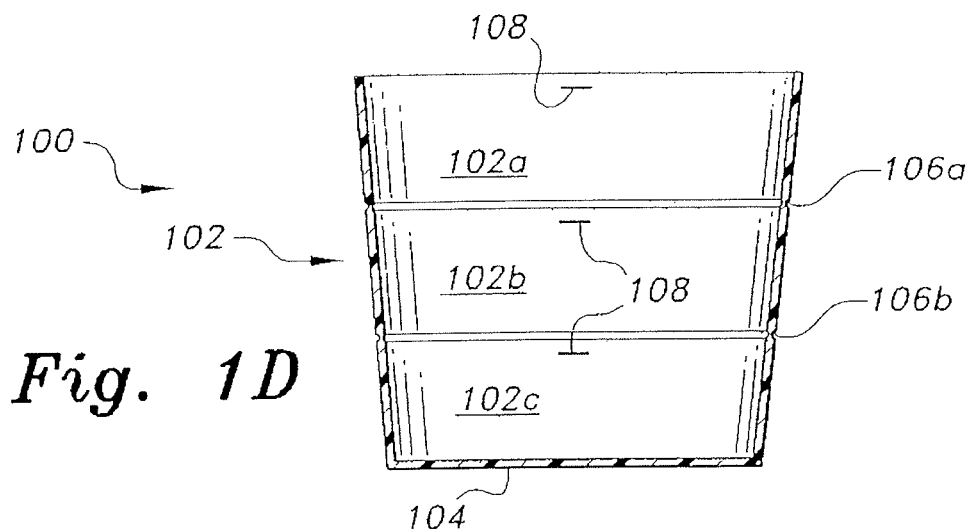
FIG. 1D is an elevation view in section of the measuring cup of FIG. 1A, showing further details thereof.

Each of the fold lines 106a, 106b may comprise a more flexible line of material about the cup 100, although the whole wall of the cup is flexible, permitting folding where required. The fold lines 106a, 106b indicate where the cup 100 should be folded for a particular measurement. In the example of FIG. 1B, the upper wall portion 102a has been folded down along the upper fold line 106a, everting the upper wall portion 102a about the intermediate wall portion 102b. This lowers the maximum height of the cup 100 to limit the internal volume thereof to a predetermined level or volume as determined by the height of the upper fold line 106a above the bottom 104. In FIG. 1C the cup 100 is folded along the lower fold line 106b, everting the upper and intermediate wall sections 102a, 102b down around the lower wall portion 102c. As the two wall portions 102a, 102b have a greater collective height than the single lower wall portion 102c, the cup 100 of FIG. 1C is supported about the rim of the upper wall portion 102a with the bottom 104 of the cup above the supporting surface, approximately level with the first fold line 106a.

Figure 2:
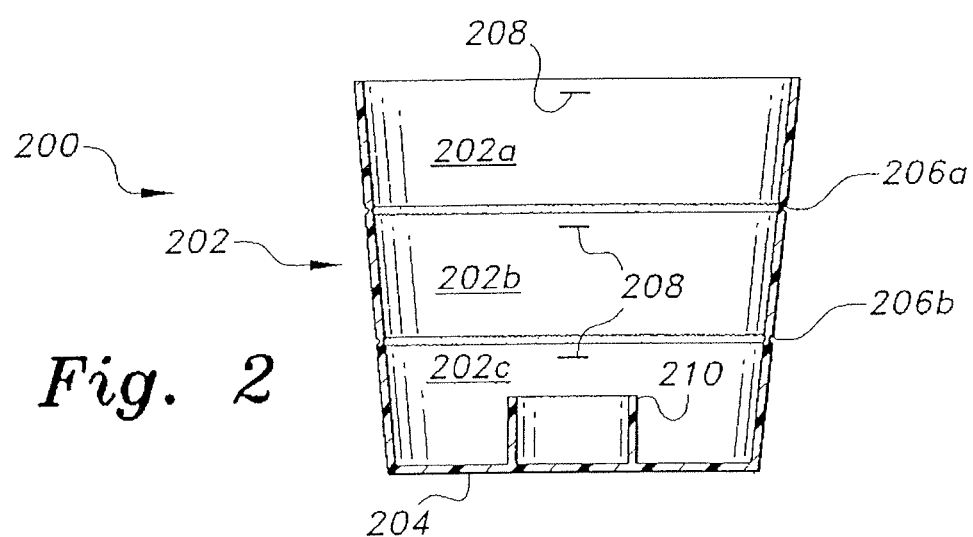
FIG. 2 is an elevation view in section of a second embodiment of a measuring cup according to the present invention, wherein the measuring cup includes an integral smaller cup in the bottom.

FIG. 2 of the drawings is an elevation view in section of a second embodiment of the measuring cup, designated as measuring cup 200. The measuring cup 200 includes all of the features of the measuring cup 100 of FIGS. 1A through 1D, i.e., a wall 202 having upper, intermediate, and lower wall portions 202a, 202b, and 202c, a bottom 204, upper and lower fold lines 206a and 206b, and quantity or level lines or marks 208. The operation of the measuring cup 200 is substantially as described further above for the measuring cup 100.

However, the measuring cup 200 includes a smaller cup or receptacle 210 disposed in or on the bottom 204 and formed integrally therewith. The smaller receptacle 210 has a smaller diameter than the diameter of the cup 200 at its base or bottom 204, and thus a smaller area. Accordingly, any given amount of liquid (or other material) placed within the smaller receptacle cup 210 will reach a higher level than would be the case in the base of the larger measuring cup 200. This allows a more accurate measurement of the smaller quantity placed within the smaller receptacle portion 210.

Figure 3:
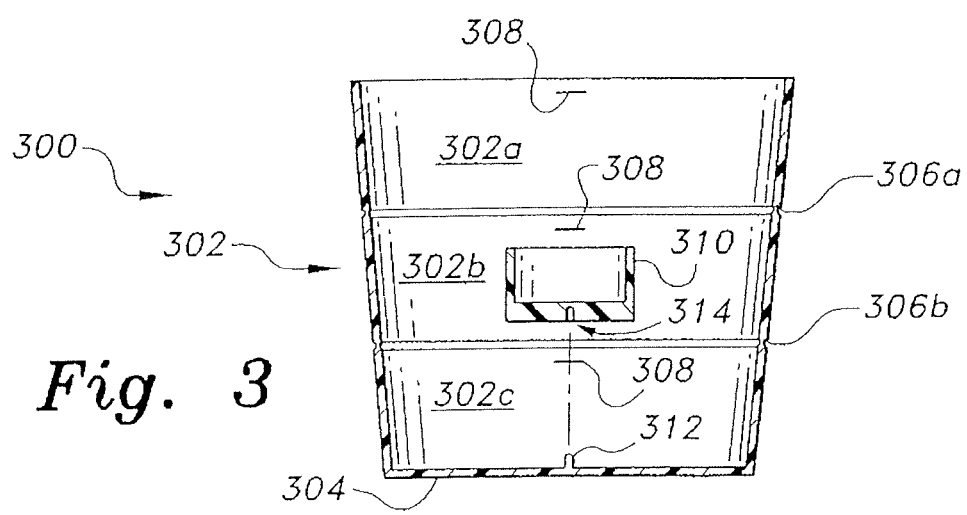
FIG. 3 is an elevation view in section of a third embodiment of a measuring cup according to the present invention, wherein the measuring cup includes a removable smaller cup in the bottom.

FIG. 3 of the drawings is an elevation view in section of a third embodiment of the measuring cup, designated as measuring cup 300. The measuring cup 300 includes all of the features of the measuring cups 100 and 200 of FIGS. 1A through 2, i.e., a wall 302 having upper, intermediate, and lower wall portions 302a, 302b, and 302c, a bottom 304, upper and lower fold lines 306a and 306b, and quantity or level lines or marks 308. The operation of the measuring cup 300 is substantially as described further above for the measuring cup 100.

The measuring cup 300 also includes a smaller receptacle or cup 310 that may be installed atop the bottom or base 304 within the internal volume of the cup 300, generally as in the measuring cup embodiment 200 of FIG. 2. However, the smaller cup or receptacle 310 is removable, rather than being permanently and integrally formed with the bottom 304 of the cup 300. A small pin 312 or the like extends upward from the bottom 304 into the interior of the cup 300. A corresponding socket or receptacle 314 is formed in the bottom of the small removable receptacle cup 310. This allows the complete interior volume of the cup 300 to be used when the measurement of a small quantity is not needed, while still providing for the accurate measurement of a relatively small quantity by temporarily and removably placing the smaller receptacle cup 310 in the bottom 304 of the cup 300.

Figure 4A:
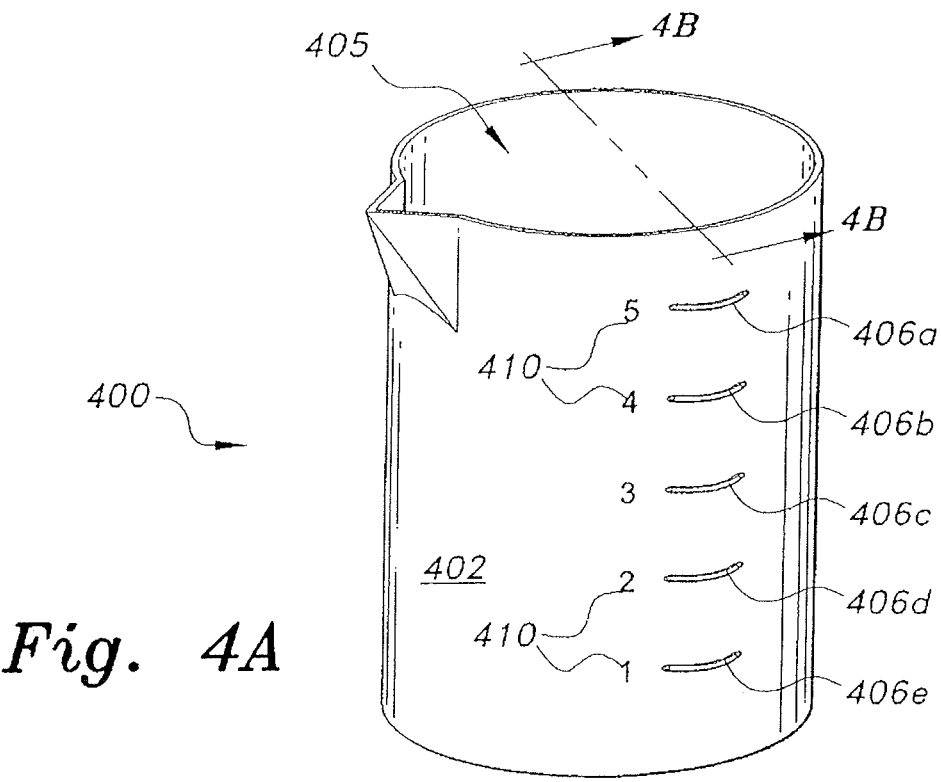
FIG. 4A is a perspective view of a fourth embodiment of a measuring cup according to the present invention, wherein the measuring cup has a plurality of transparent external horizontal level indicator tubes.
Figure 4B:
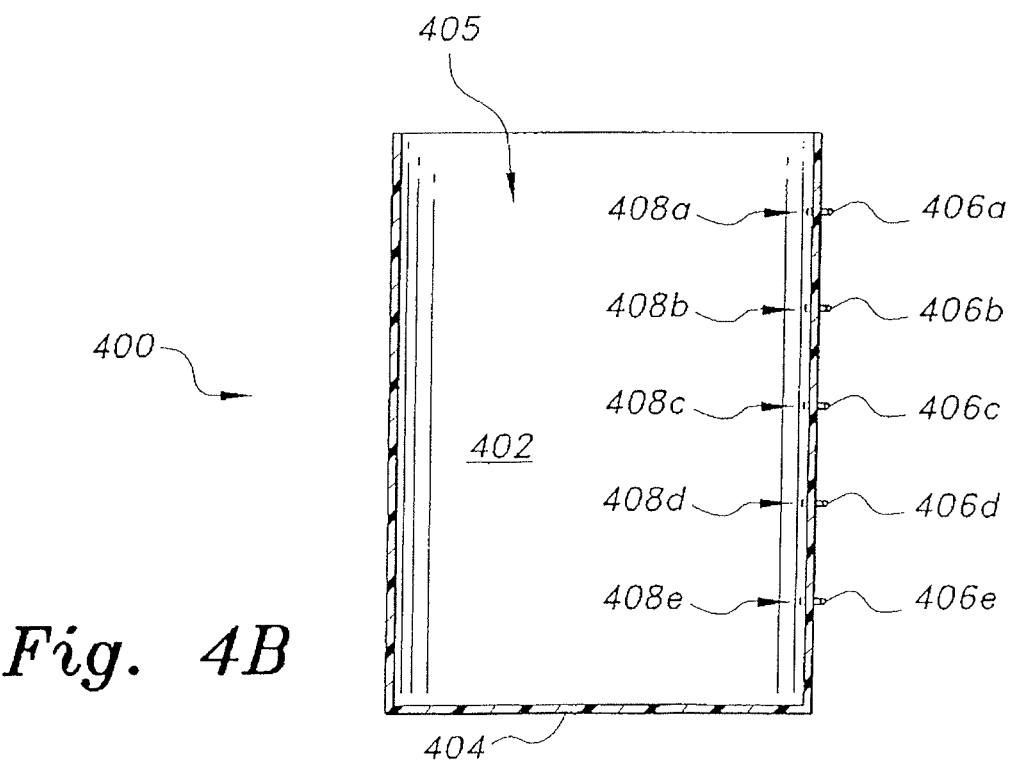
FIG. 4B is an elevation view in section of the measuring cup embodiment of FIG. 4A.

FIGS. 4A and 4B of the drawings are illustrations of a fourth embodiment measuring cup, designated as measuring cup 400. The measuring cup 400 includes a peripheral wall 402 and a bottom 404 (FIG. 4B) defining an interior or internal volume 405. The wall 402 is of a rigid, unitary construction. The cup or container 400 may have a beaker configuration including a spout, as shown in FIG. 4A, or may be devoid of such a spout, if desired. The quantity or volume determination means is different in the cup 400 from the cups of other embodiments, comprising a plurality of transparent horizontal sight windows in the form of hollow tubes 406a through 406e disposed externally on the cup wall 402. More or fewer sight tubes can be provided. Each of the sight tubes 406a through 406e communicates with the interior of the cup 400 through a corresponding pair of passages, i.e., passages 408a through 408e (FIG. 4B). Fluid can flow outward from the internal volume of the cup 400 through the passages 408a through 408e and into the corresponding hollow transparent sight tubes 406a through 406e. Any fluid within the cup 400 will be visible from the outside of the cup as the fluid flows through any given passage pair 408a through 408e and into the corresponding sight tube 406a through 406e, thus allowing a user of the cup 400 to readily determine the level of the fluid within the cup. Corresponding quantity, volume, or level indicators 410 can be provided adjacent to the sight passages 408a through 408e.

Figure 5:
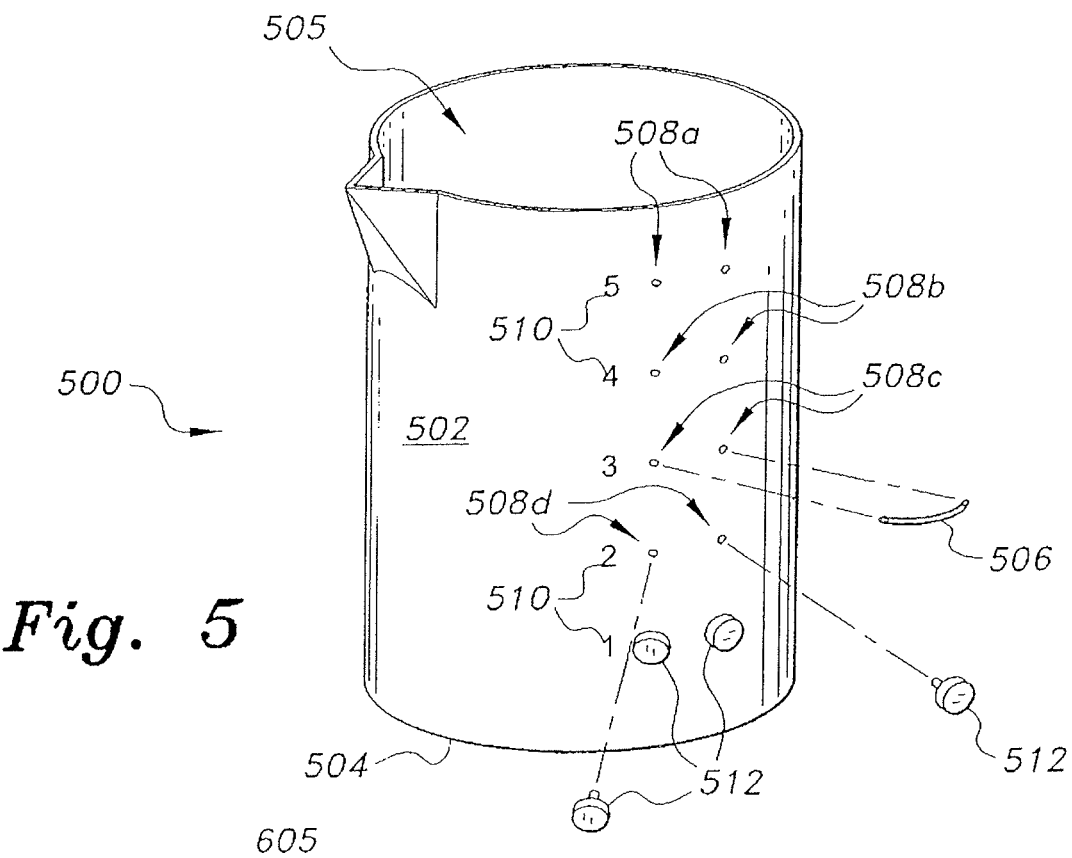
FIG. 5 is a perspective view of a fifth embodiment of a measuring cup according to the present invention, wherein the external horizontal level indicator tubes are removable.

FIG. 5 of the drawings is a perspective view of a fifth embodiment of a measuring cup, designated as measuring cup 500. The measuring cup 500 includes a peripheral wall 502 and a bottom 504 defining an interior or internal volume 505, the wall 502 being of a rigid, unitary construction. The cup or container 500 may have a beaker configuration including a spout, or may be devoid of such a spout, if desired. The quantity or volume determination means differs in the cup 500 from the cup 400, in that only a single sight window is provided in the form of a horizontal hollow sight tube 506. Only one such sight window or tube 506 is needed in this embodiment, as it is removable from the cup wall 502. A plurality of horizontally disposed passage pairs 508a through 508e is provided through the cup wall 502 (the lowermost passages of the passage pair 508e is concealed by installed plugs 512). The sight window tube 506 is selectively installed in the desired passage pair, e.g., the medial horizontal passage pair 508c, so that fluid flows outward through the passages 508c and into the hollow sight window tube 506 when the quantity within the cup 500 reaches that level. Lower ports or passages 508d and 508e are plugged with plugs 512. Corresponding quantity, volume, or level indicators 510 can be provided adjacent to the sight passages 508a through 508e.

Figure 6:
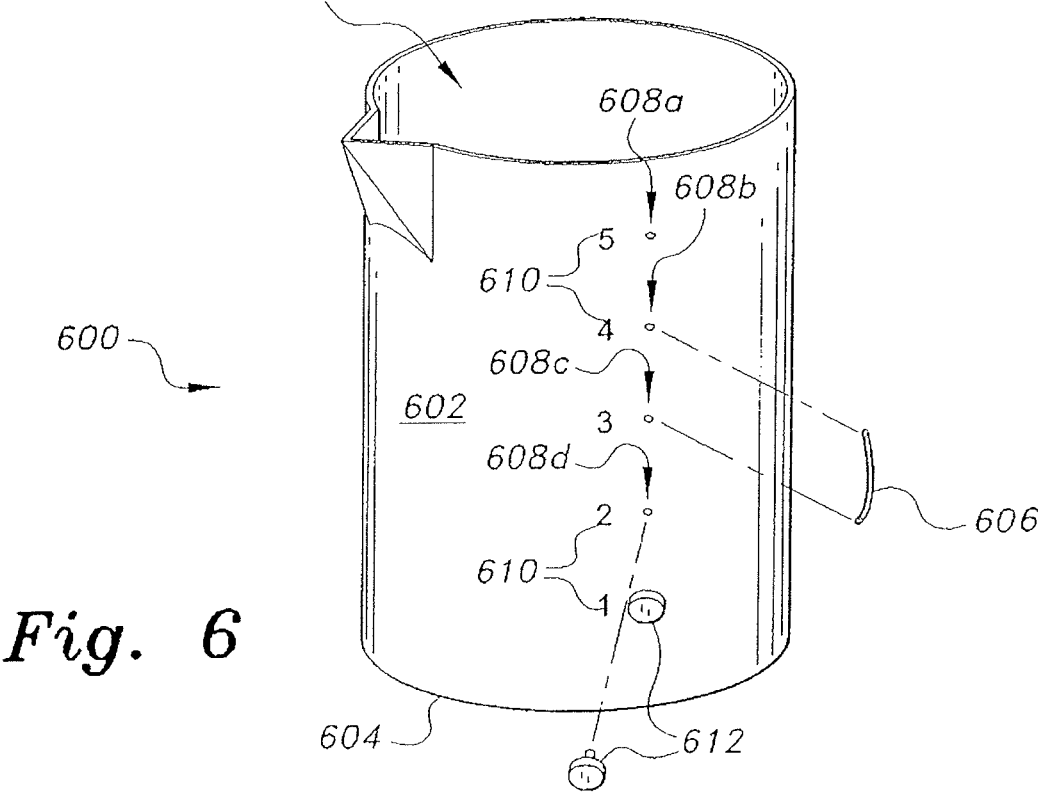
FIG. 6 is a perspective view of a sixth embodiment of a measuring cup according to the present invention, wherein the removable level indicator tube is disposed vertically.

FIG. 6 of the drawings is a perspective view of a sixth embodiment of a measuring cup, designated as measuring cup 600. The measuring cup 600 includes a peripheral wall 602 and a bottom 604 defining an interior or internal volume 605, the wall 602 being of a rigid, unitary construction. The cup or container 600 may have a beaker configuration including a spout, or may be devoid of such a spout, if desired. The quantity or volume determination means differs in the cup 600 from the cup 400, in that only a single sight window is provided in the form of a vertical hollow sight tube 606. Only one such sight window or tube 606 is needed in this embodiment, as it is removable from the cup wall 602. A single column of vertically disposed passages 608a through 608e is provided through the cup wall 602 (the lowermost passage 608e is concealed by one of the installed plugs 612). The sight window tube 606 is selectively installed between or across two of the desired adjacent passages, e.g., the medial passage 608c and the passage 608b immediately above, so that fluid flows outward through the passages 608c and into the hollow sight window tube 606 when the quantity within the cup 600 reaches that level. Lower ports or passages 608d and 608e are plugged with plugs 612. Corresponding quantity, volume, or level indicators 610 can be provided adjacent to the sight passages 608a through 608e.

Figure 7:
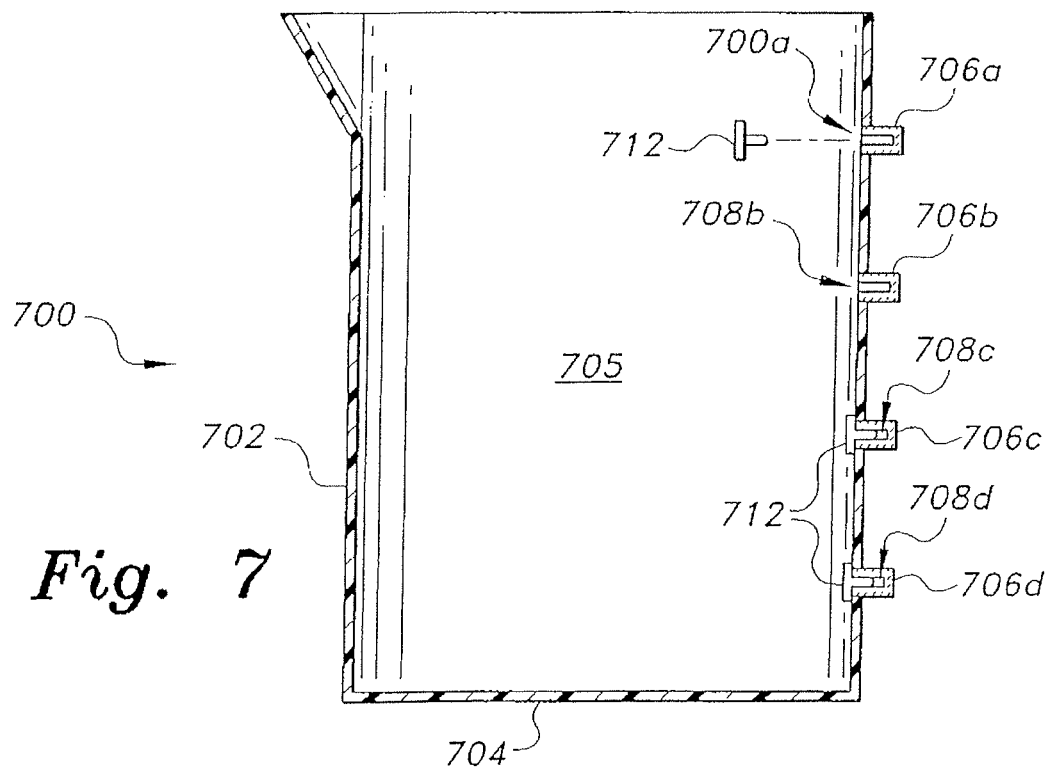
FIG. 7 is an elevation view in section of a seventh embodiment of a measuring cup according to the present invention, wherein the cup has a plurality of transparent level indicator windows therein.

FIG. 7 of the drawings is a perspective view of a seventh embodiment of a measuring cup, designated as measuring cup 700. The measuring cup 700 includes a peripheral wall 702 and a bottom 704 defining an interior or internal volume 705, the wall 702 being of a rigid, unitary construction. The cup or container 700 may have a beaker configuration including a spout, or may be devoid of such a spout, if desired. The quantity or volume determination means differs from the measuring cup embodiment 600 of FIG. 6, in that each passage of the single column of vertically disposed passages 708a through 708d terminates in a small transparent viewport, respectively 706a through 706d, permanently disposed through the wall 702 of the container 700. The measuring cup 700 is used by installing plugs 712 in passages other than the desired single passage, e.g., the second highest passage 708b in FIG. 7. This results in the fluid contained within the interior 705 of the cup 700 flowing only into the unplugged viewport, e.g., viewport 706b, to indicate that the fluid has reached that level within the cup 700.

Figure 8:
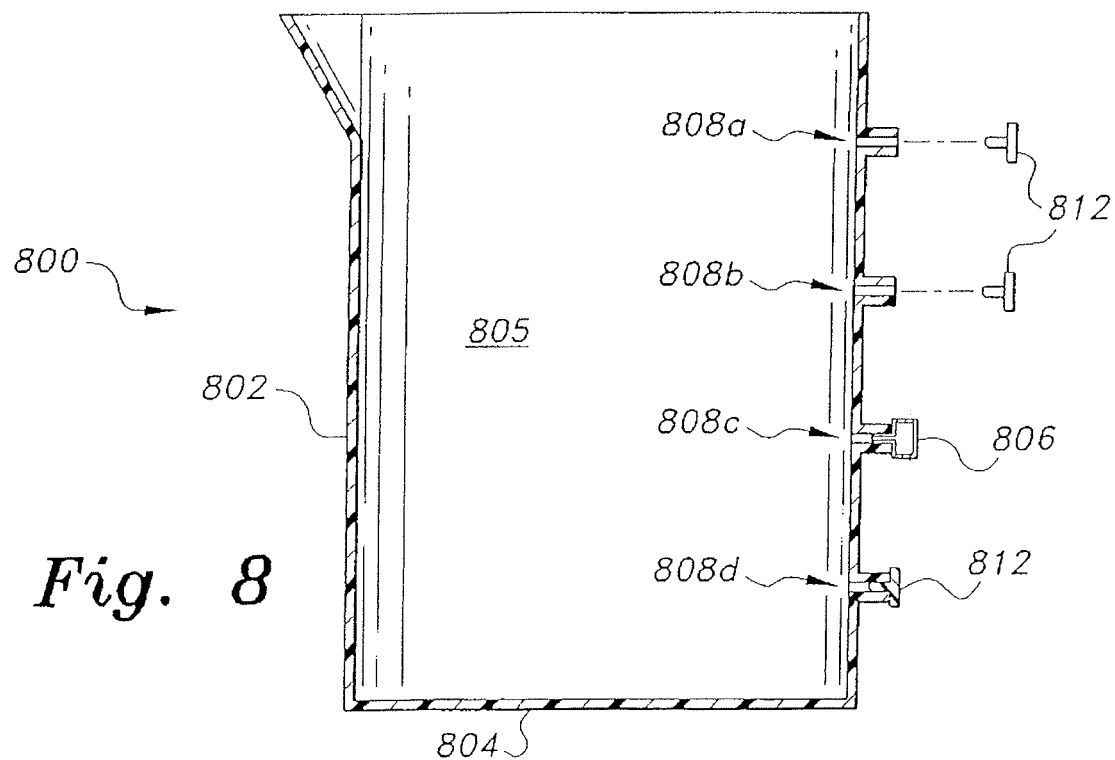
FIG. 8 is an elevation view in section of an eighth embodiment of a measuring cup according to the present invention, wherein the cup has a plurality of selectively sealed ports and a transparent viewing port selectively installable therein.

FIG. 8 of the drawings is a perspective view of an eighth embodiment of a measuring cup, designated as measuring cup 800. The measuring cup 800 includes a peripheral wall 802 and a bottom 804 defining an interior or internal volume 805, the wall 802 being of a rigid, unitary construction. The cup or container 800 may have a beaker configuration including a spout, or may be devoid of such a spout, if desired. The quantity or volume determination means differs from the measuring cup embodiment 700 of FIG. 7, in that only a single small transparent viewport 806 is provided. The passages 808a through 808d pass completely through the wall 802 of the cup 800, thus requiring plugs 812 for those passages not having the viewport 806 installed therein. The single viewport 806 is removable and is selectively installed in a desired one of the passages 808a through 808d, e.g., the third passage from the top 808c. The other passages are plugged by plugs 812 to preclude flow therethrough, as noted further above. In this manner, the desired quantity or volume of fluid is noted when the fluid in the cup 800 reaches a level sufficient to flow into the single viewport 806.

Figure 9:
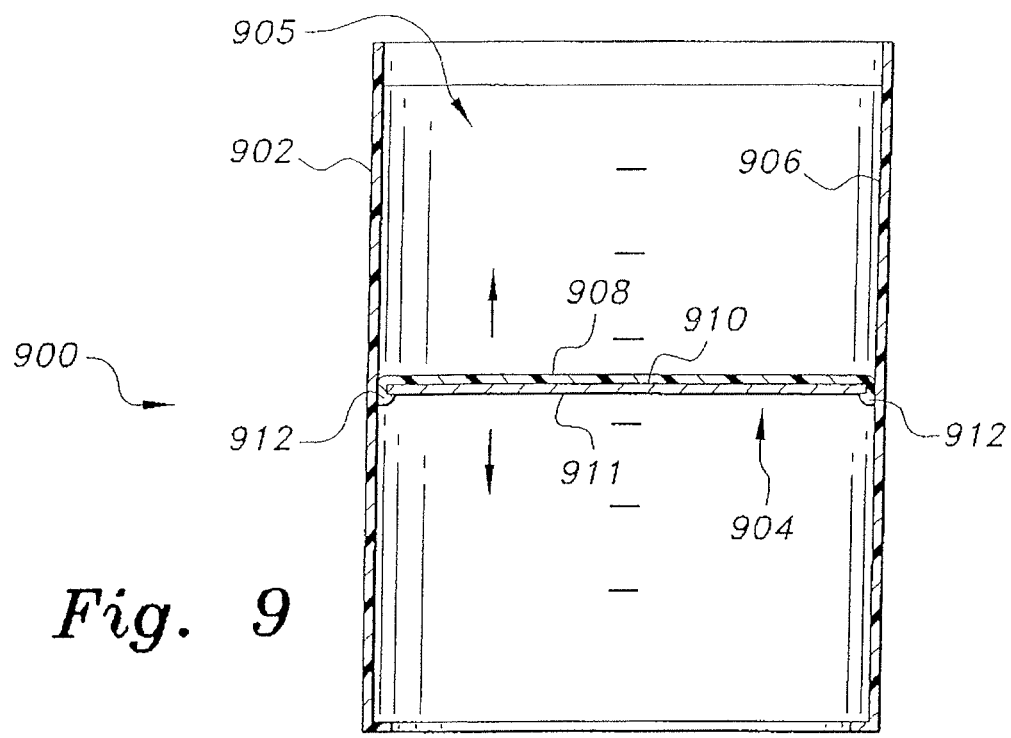
FIG. 9 is an elevation view in section of a ninth embodiment of a measuring cup according to the present invention, wherein the cup has an adjustable level bottom.
Figure 10:
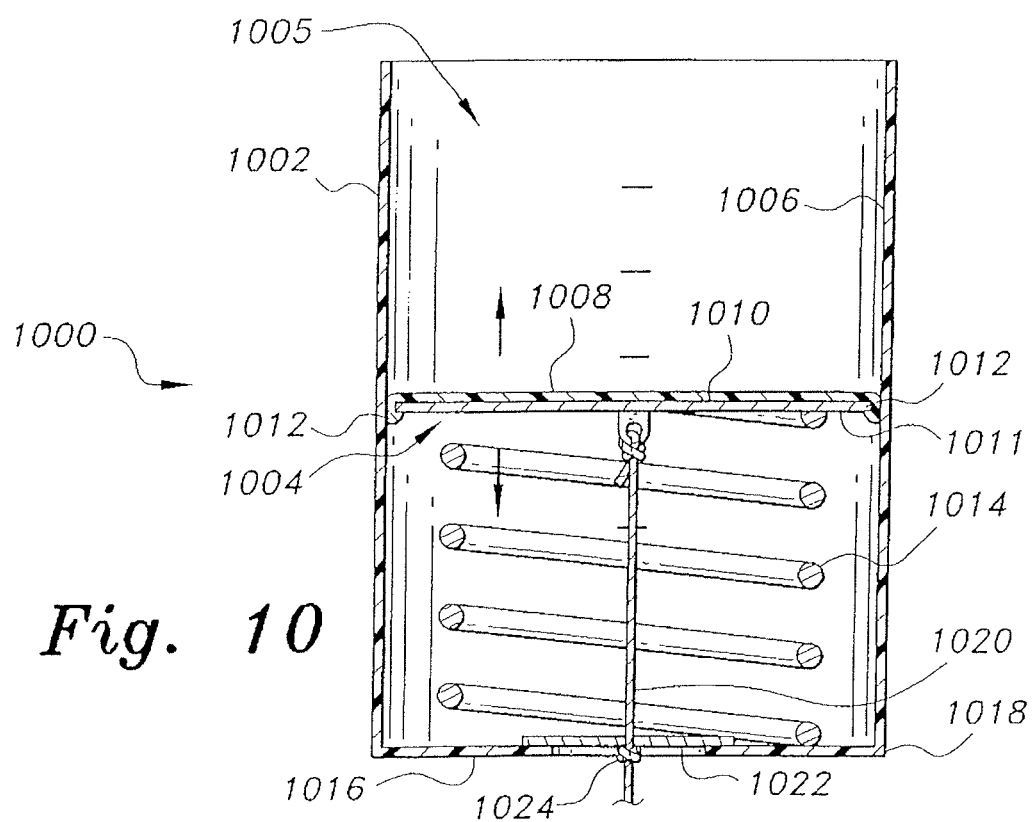
FIG. 10 is an elevation view in section of a tenth embodiment of a measuring cup according to the present invention, wherein the adjustable level bottom is biased upward by a spring and downward by a tensile member.

FIGS. 9 and 10 illustrate elevation views in section of additional measuring cups wherein the bodies or walls of the cups comprise open hollow cylinders and adjustable height bottoms installed therein to adjust the internal volumes of the cups. In FIG. 9, the cup or container 900 includes a peripheral wall 902 and an adjustable height bottom 904 installed therein. The wall 902 has an inner surface 906 defining a container interior 905 therein. The bottom 904 comprises a thin, rigid plate that may or may not include a coating of resilient material (e.g., rubber, silicone, etc.) 908 disposed over the upper surface 910 and circumferentially about the periphery 912 thereof. In either case, the outer edge or periphery of the plate 904 forms a seal against the inner surface 906 of the wall 902. The lower surface 911 of the bottom plate 904 may remain uncoated when the resilient coating 908 is used on the upper surface 910 and the periphery 912 of the plate 904. The frictional fit between the bottom plate 904 and the inner surface 906 of the wall 902 results in the bottom plate 904 remaining in place within the cup wall 902 when adjusted, thus setting the internal volume of the cup 900.

FIG. 10 is an elevation view in section of another embodiment of a measuring cup having an adjustably positionable bottom. The measuring cup 1000 of FIG. 10 includes a peripheral wall 1002 and an adjustable height bottom 1004 installed therein. The wall 1002 has an inner surface 1006 defining a container interior 1005 therein. The bottom 1004 comprises a thin, rigid plate having a coating of resilient material (e.g., rubber, silicone, etc.) 1008 disposed over the upper surface 1010 and circumferentially about the periphery 1012 thereof. The outer edge or periphery of the resilient material seals against the inner surface 1006 of the wall 1002. The lower surface 1011 of the bottom plate 1004 may remain uncoated. In the measuring cup 1000 of FIG. 10, a compression spring 1014 is installed beneath the adjustable bottom plate 1004 and a flange 1016 extends inward from the lower edge 1018 of the cup or container wall 1002. A tensile member 1020, e.g., string or cord, wire, etc., is attached to the lower surface 1011 of the bottom plate 1004, and extends downward through the spring and out of the base of the cup 1000 beyond the flange 1016. A retainer 1022 is disposed across the opening through the center of the flange 1016, the retainer 1022 having a small passage therethrough sufficient to provide clearance for the tensile member 1020. Some means of increasing the diameter of the tensile member 1020, e.g., a knot 1024, small clip, etc., is provided in the tensile member 1020 at a predetermined point to adjust the height or level of the bottom 1004 within the cup wall 1002. As the spring 1014 urges the bottom 1004 toward the top of the cup 1000 to reduce the internal volume of the cup, the tensile member 1020 is adjusted to lower the bottom 1004 to the desired level and secured by forming a knot 1024 below the retainer 1022 to prevent the bottom 1004 from rising due to the pressure of the spring 1014.

Figure 11:
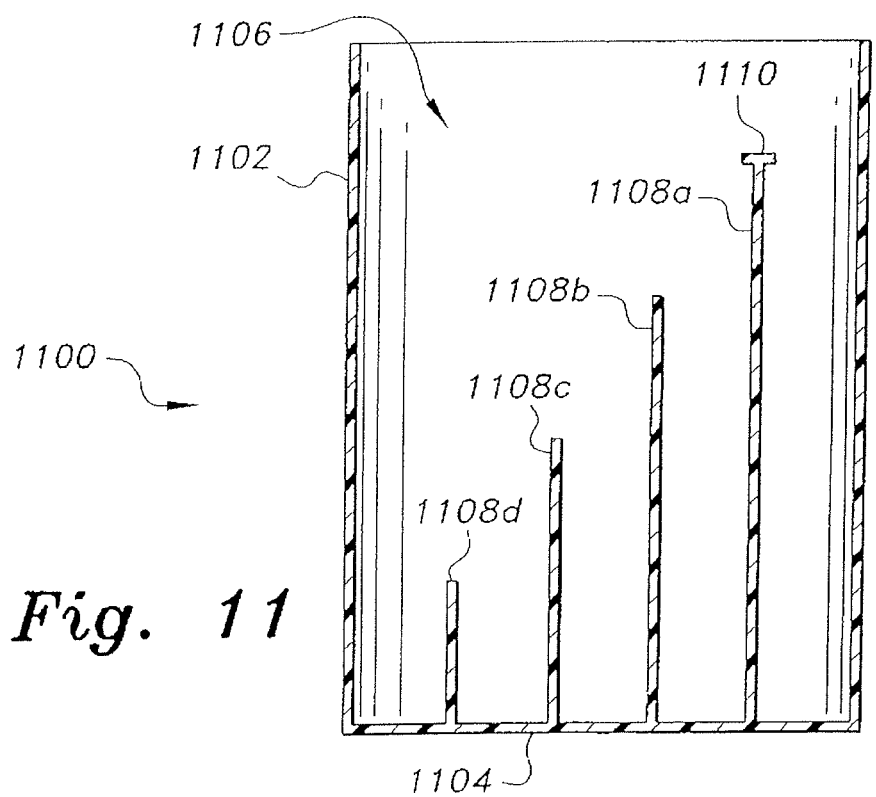
FIG. 11 is an elevation view in section of an eleventh embodiment of a measuring cup according to the present invention, wherein the cup has a plurality of level indicator rods of different height from one another extending upward from the bottom.

FIG. 11 is an elevation view in section of an eleventh embodiment of a measuring cup, designated as measuring cup 1100. The measuring cup 1100 substantially comprises a wall 1102 and a fixed bottom 1104 defining an interior or internal volume 1106. The measurement means for the measuring cup 1100 comprises a plurality of quantity indicator rods 1108a through 1108d attached to the interior surface of the cup bottom 1104 and extending upward into the interior 1106 of the cup 1100. The rods 1108a through 1108d are all of different heights from one another in order to indicate different volumes or quantities within the cup 1100. The heights of the rods 1108a through 1108d are predetermined to indicate a precise volume within the cup 1100 when the cup is level and when the level of fluid contained within the cup is exactly level with the top of a given rod. A small, flat level indicator can be placed atop any or all of the rods to more precisely indicate the fluid level within the cup at that height or level, e.g., the level indicator 1110 disposed atop the highest level indicator rod 1108a. More or fewer such rods can be provided, depending upon the degree of resolution desired for determining the quantity of fluid contained within the cup 1100.

Figure 12:
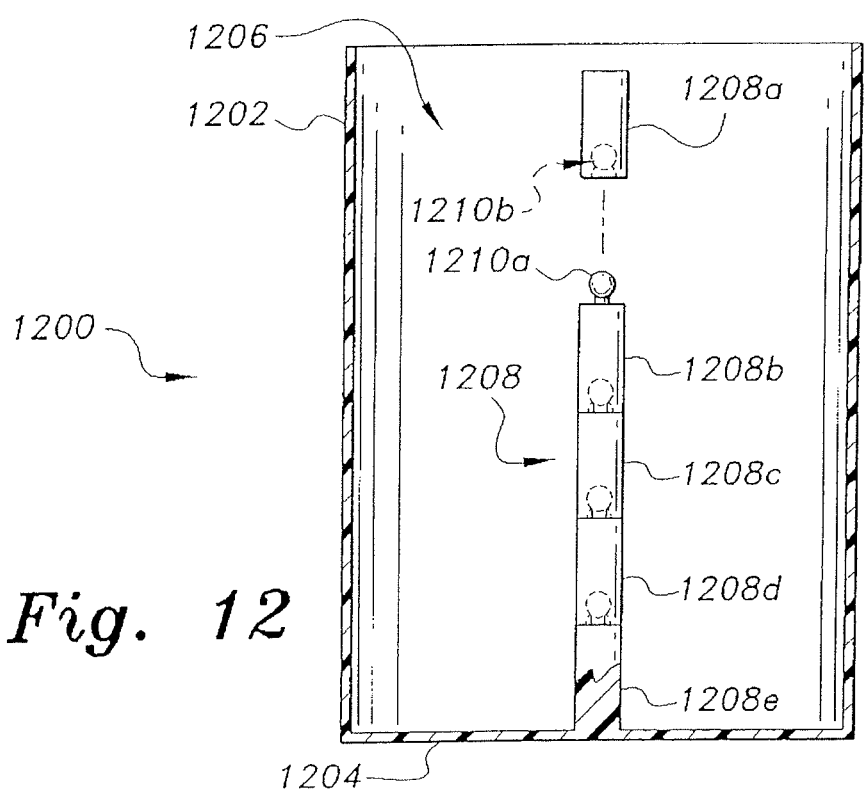
FIG. 12 is an elevation view in section of a twelfth embodiment of a measuring cup according to the present invention, wherein a single level indicator rod having a plurality of selectively installable segments extends upward from the bottom.

FIG. 12 is an elevation view in section of a twelfth embodiment of a measuring cup, designated as measuring cup or container 1200. The measuring cup 1200 substantially comprises a wall 1202 and a fixed bottom 1204 defining an interior or internal volume 1206. The measurement means for the measuring cup 1200 comprises a single quantity indicator rod 1208 formed of a plurality of smaller rod segments 1208a through 1208d attached to a base rod segment 1208e that is permanently affixed to the cup bottom 1204, and extends upward into the interior 1206 of the cup 1200. Each of the rod segments 1208a through 1208e can be identical to one another in length to indicate equal increments in the quantity of fluid contained within a cylindrical cup of constant cross section, or the rod segments can be of differing lengths to indicate various predetermined quantities. The various rod segments 1208a through 1208e can be selectively connected to one another by complementary ball and socket fittings, respectively 1210a and 1210b, or other known removable connector means.

Figure 13:
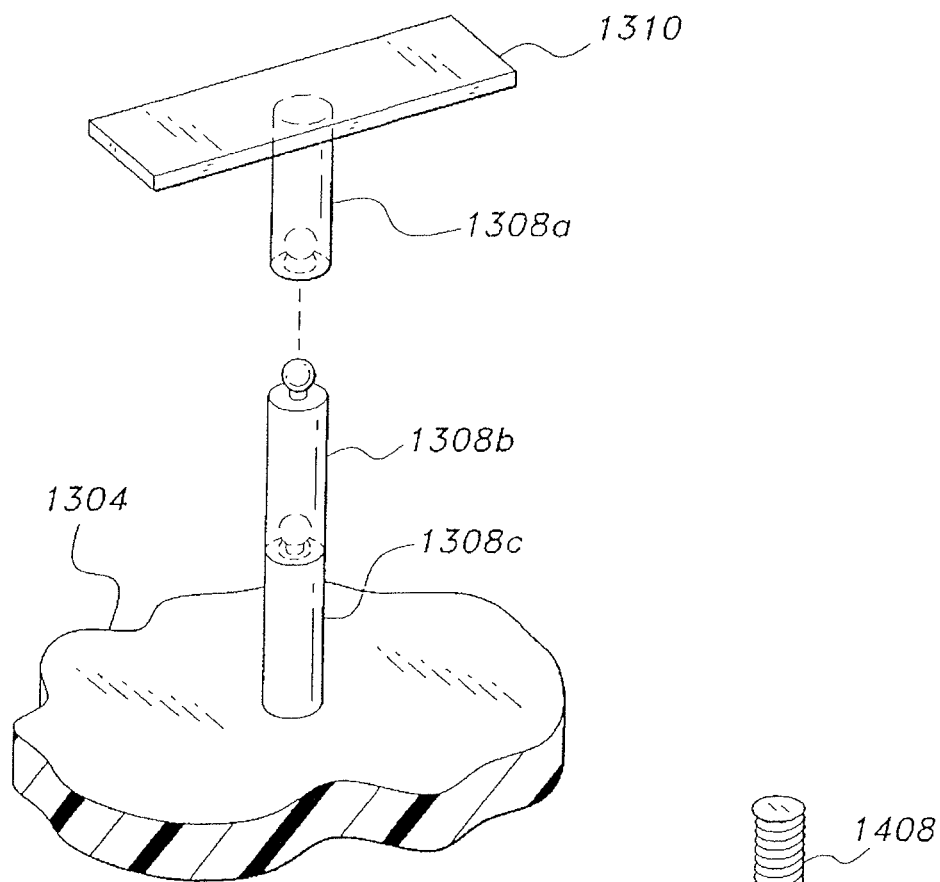
FIG. 13 is partial perspective view of a thirteenth embodiment of a measuring cup according to the present invention, wherein the single level indicator rod includes a horizontal indicator tab extending from the uppermost segment thereof, the cup bottom being broken away and in section.

FIG. 13 is a broken away detailed perspective view of a portion of a cup bottom 1304 having a base rod segment 1308c permanently attached thereto and extending upward therefrom. One or more intermediate rod segments, e.g., rod segment 1308b, can be assembled atop the base segment 1308c, and an uppermost or top rod segment 1308a is installed atop the highest intermediate segment, substantially as illustrated in FIG. 12 and described above. However, the uppermost rod segment 1308a includes a level indicator tab 1310 disposed upon its upper end to more precisely indicate the exact level of the cup contents when the fluid reaches the level indicator tab. The specific shape of the level indicator tab 1310 can be a rectangle, as shown in FIG. 13, or some other regular or irregular shape.

Figure 14:
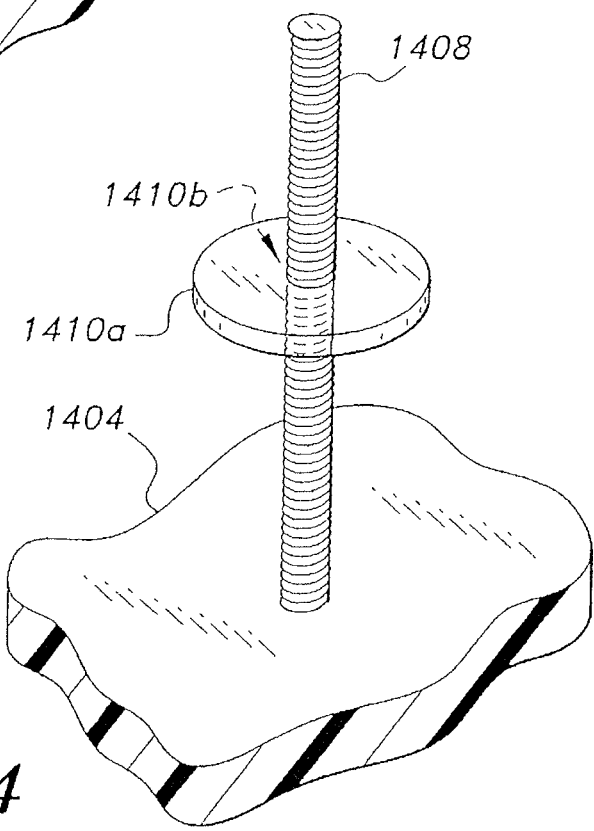
FIG. 14 is a partial perspective view of a fourteenth embodiment of a measuring cup according to the present invention, wherein the level indicator rod is threaded and the level indicator is cooperatively threaded and disposed upon the rod, the cup bottom being broken away and in section.

FIG. 14 is a broken away detailed perspective view of a portion of a cup bottom 1404 having a single threaded quantity indicator rod 1408 permanently attached thereto and extending upward therefrom. A level indicator tab 1410a having a cooperatively threaded passage 1410b formed therethrough is threadably installed upon the indicator rod 1408, and can be adjusted up and down along the height of the rod 1408 to a desired predetermined level.

Figure 15:
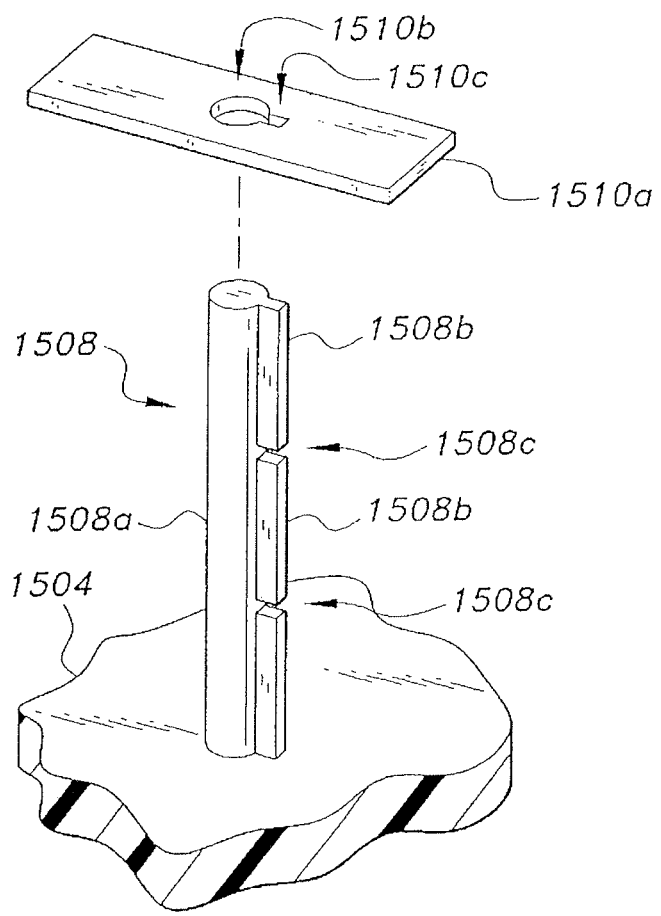
FIG. 15 is a partial perspective view of a fifteenth embodiment of a measuring cup according to the present invention, wherein the level indicator rod has a circular cross section with a radial extension, the extension being slotted, and the level indicator tab has a congruent passage therethrough for selective placement in the slots of the rod, the cup bottom being broken away and in section.

FIG. 15 is a broken away detailed perspective view of a portion of a cup bottom 1504 having a single quantity indicator rod 1508 permanently attached thereto and extending upward therefrom. The rod 1508 comprises a major portion 1508a having a circular cross section and a flange 1508b extending radially therefrom. The flange 1508b includes a plurality of notches 1508c disposed therein. A level indicator tab 1510a includes a circular passage 1510b therethrough having a radial extension 1510c, the passage 1510b and the extension 1510c being congruent with the rod portion 1508a and its flange 1508b. The level indicator tab 1510a can be lowered over the rod 1508 when the extension 1510c of the tab passage 1510b is aligned with the flanges 1508b of the rod 1508. When the tab 1510a is lowered to a predetermined quantity level as defined by one of the notches 1508c of the rod 1508, the tab 1510a is rotated about the rod 1508 to capture the internal edge of the circular passage 1510b of the tab 1510a in the selected notch 1508c of the rod 1508, thereby locking the height of the tab 1510a on the rod 1508.

Figure 16:
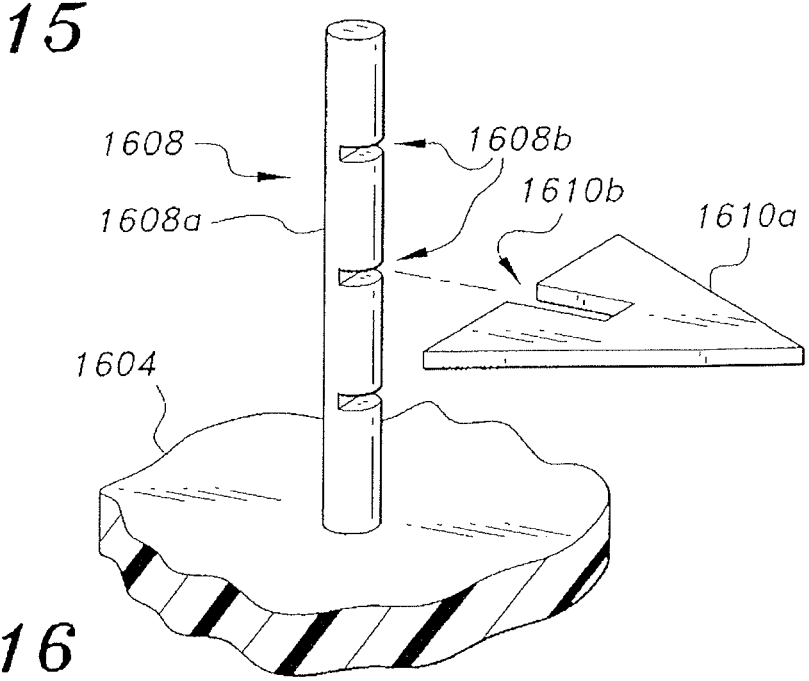
FIG. 16 is a partial perspective view of a sixteenth embodiment of a measuring cup according to the present invention, wherein the level indicator rod is slotted and the level indicator tab includes a notch therein for selective placement in the slots of the rod, the cup bottom being broken away and in section.

FIG. 16 is a broken away detailed perspective view of a portion of a cup bottom 1604 having a single quantity indicator rod 1608 permanently attached thereto and extending upward therefrom. The rod 1608 comprises a major portion 1608a having a circular cross section, with a plurality of notches 1608b disposed therein. A level indicator tab 1610a includes a slot 1610b in one side or edge thereof. While the level indicator tab 1610a is shown as a triangular shape in FIG. 16, the tab 1610a may have any regular or irregular shape. The level indicator tab 1610a is installed on the rod 1608 by aligning the tab slot 1610*b* with a selected one of the notches 1608*b* of the rod 1608 to set the height of the tab 1610 to measure the height of a volume of fluid contained within the cup.

Figure 17:
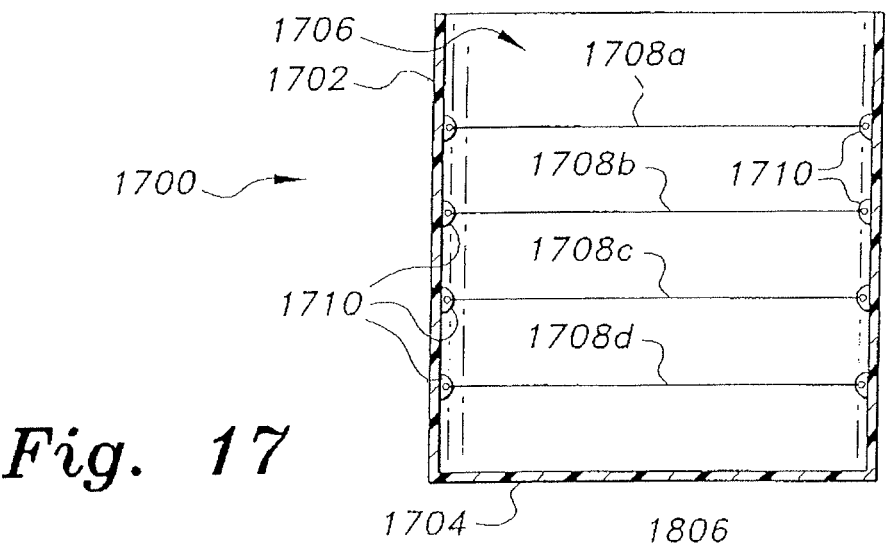
FIG. 17 is an elevation view in section of a seventeenth embodiment of a measuring cup according to the present invention, wherein the cup includes a plurality of horizontal level indicator filaments extending thereacross.
Figure 18:
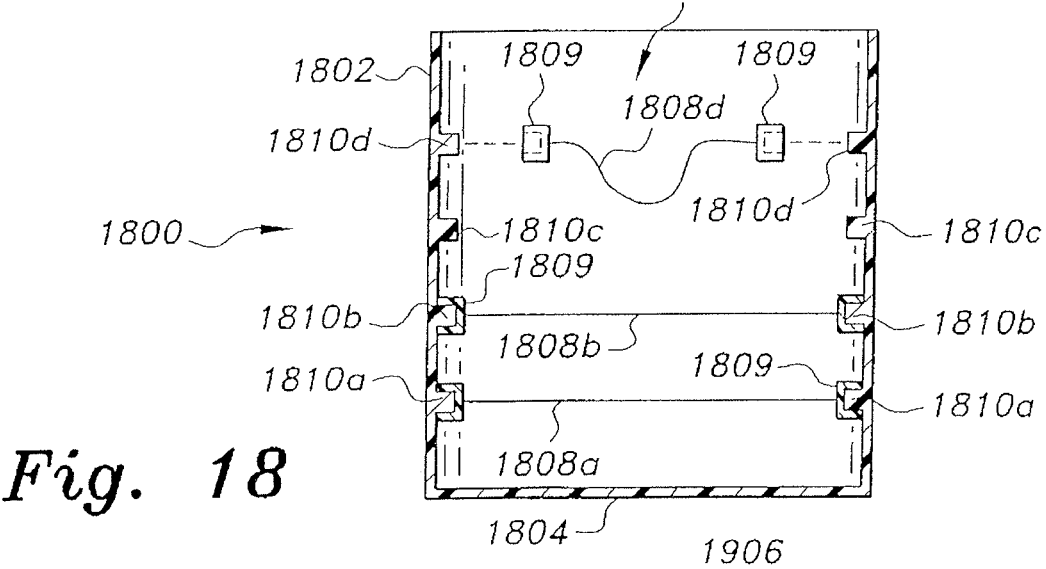
FIG. 18 is an elevation view of an eighteenth embodiment of a measuring cup according to the present invention, wherein the cup includes a plurality of opposed pins therein and the filament includes sockets at each end thereof for removable installation on the pins.
Figure 19:
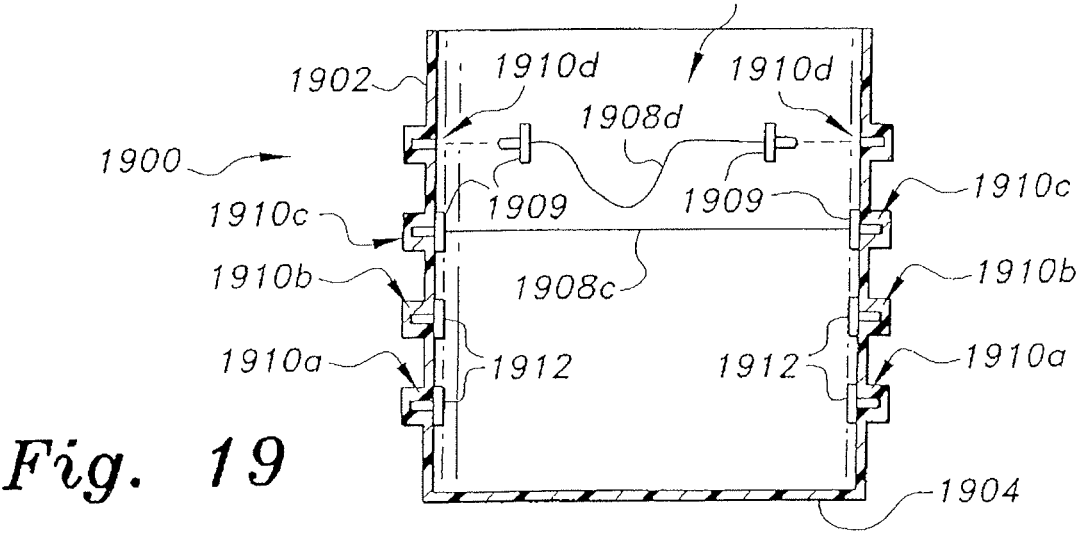
FIG. 19 is an elevation view of a nineteenth embodiment of a measuring cup according to the present invention, wherein the cup includes a plurality of opposed sockets therein and the filament includes pins at each end for removable installation in the sockets.

FIGS. 17 through 19 are elevation views in section of three related embodiments of a measuring cup in which one or more level indicator filaments (rubber string, wires, plastic monofilaments, etc.) extend horizontally across the interior of the cup. In FIG. 17, the measuring cup 1700 includes a wall 1702 and bottom 1704 defining a cup interior 1706. A plurality of level indicator filaments 1708*a* through 1708*d* is permanently attached to the interior of the cup wall 1702, e.g., by small attachment points 1710 disposed at various predetermined heights along the cup wall 1702, the heights of the filament attachment points 1710 being predetermined to set the levels of the filaments 1708*a* through 1708*d* according to predetermined volumes within the cup or container 1700.

In FIG. 18, the measuring cup 1800 includes a wall 1802 and bottom 1804 defining a cup interior 1806. A plurality of level indicator filaments, e. g., filaments 1808*a*, 1808*b*, and 1808*d*, is removably attached to the interior of the cup wall 1802. Each of the filaments includes mutually opposed first and second ends, each end having a small socket or receptacle 1809 installed thereon. The interior of the cup wall 1802 has a plurality of filament attachment pins 1810*a* through 1810*d* installed thereon at various predetermined heights along the cup wall 1802. The pins are disposed as pairs, the two pins of each pair being horizontally opposed to one another. The heights of the filament attachment pin pairs 1810*a* through 1810*d* are predetermined to set the levels of the filaments 1808*a* through 1808*d* according to predetermined volumes within the cup or container 1800.

In FIG. 19, the measuring cup 1900 includes a wall 1902 and a bottom 1904 defining a cup interior 1906. A plurality of level indicator filaments, e. g., filaments 1908*c* and 1908*d*, is removably attached to the interior of the cup wall 1902. Each of the filaments includes mutually opposed first and second ends, each end having a small pins or pegs 1909 installed thereon. The interior of the cup wall 1902 has a series of filament attachment sockets or receptacles 1910*a* through 1910*d* installed therein at various predetermined heights along the cup wall 1902. The sockets or receptacles are disposed in pairs, the two sockets of each pair being horizontally opposed to one another. The heights of the filament attachment socket or receptacle pairs 1910*a* through 1910*d* are predetermined to set the levels of the filaments 1908*a* through 1908*d* according to predetermined volumes within the cup or container 1900.

Figure 20:
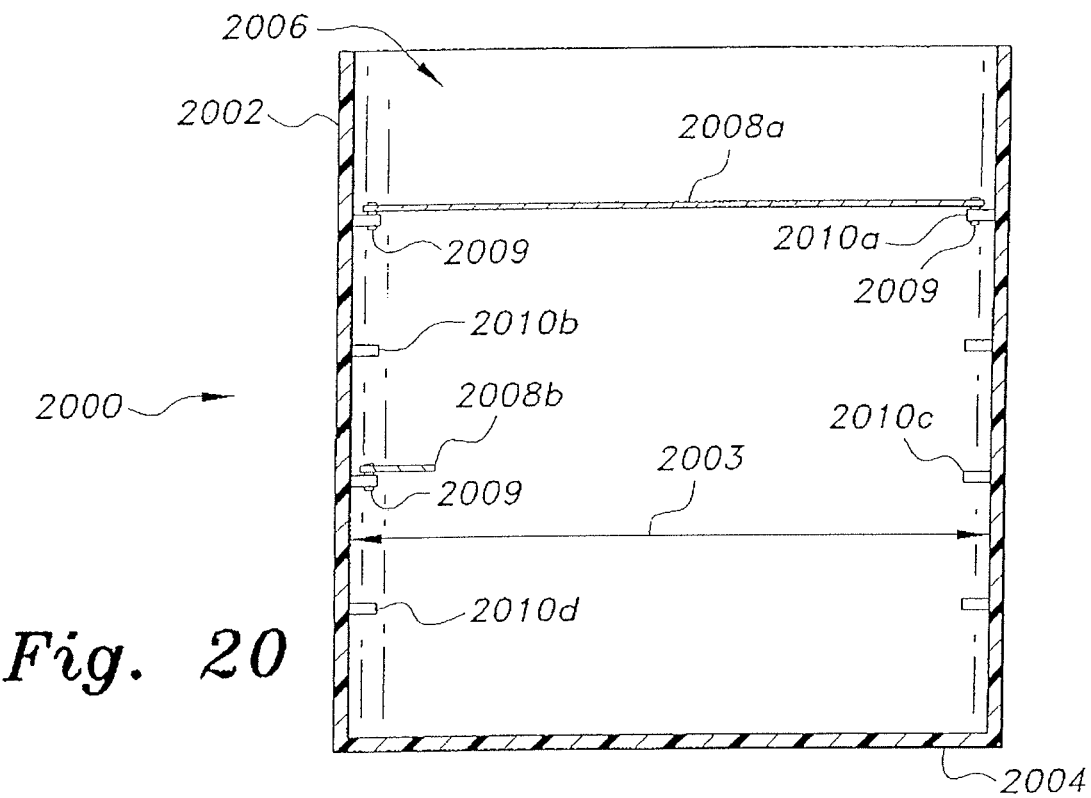
FIG. 20 is an elevation view in section of a twentieth embodiment of a measuring cup according to the present invention, wherein the cup includes a plurality of opposed pins therein and the level indicator comprises an elongate component with clips on the ends for selectively engaging the pins of the cup.

FIG. 20 is a side elevation view in section of a twentieth embodiment of a measuring cup or container, designated as measuring cup 2000. The measuring cup 2000 includes a peripheral wall 2002 defining an interior span 2003. The wall 2002 and bottom 2004 of the cup 2000 define a cup interior 2006. The interior of the cup wall 2002 has a plurality of level indicator attachment pins 2010*a* through 2010*d* installed thereon at various predetermined heights along the cup wall 2002 and extending for a short distance into the interior 2006 of the cup 2000. The pins are disposed in pairs, the two pins of each pair being horizontally opposed to one another. The heights of the level indicator attachment pin pairs 2010*a* through 2010*d* are predetermined to set the levels of corresponding level indicators (described below) according to predetermined volumes within the cup or container 2000. A first type of level indicator 2008*a* comprises a thin, rigid elongate element having a length substantially equal to the interior span 2003 of the cup 2000.

The level indicator 2008*a* has mutually opposed first and second ends, each end having a small clip 2009 extending therefrom. The clips 2009 are adapted to removably grip the two opposed pins of a selected pair of pins 2010*a* through 2010*d*, thereby setting the height of the level indicator 2008*a* across the interior span 2003 of the cup 2000. A second type of level indicator 2008*b* comprises a thin, rigid element having a length substantially less than the interior span 2003 of the cup or container 2000. A single clip 2009 extends from one end of the level indicator 2008*b* for removable attachment of the level indicator 2008*b* to one pin of a selected pair of pins, the free opposite end of the relatively short level indicator 2008*b* being cantilevered into the interior volume 2006 of the cup 2002.

Figure 21:
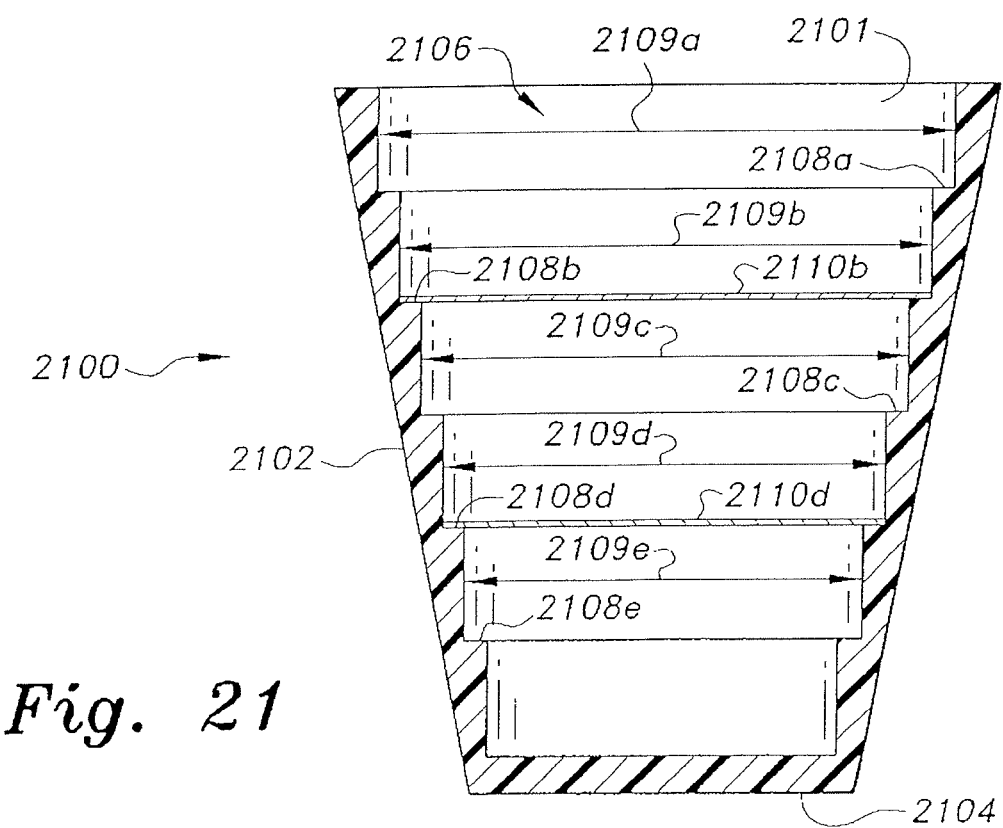
FIG. 21 is an elevation view in section of a twenty-first embodiment of a measuring cup according to the present invention, wherein the cup includes a plurality of steps therein with a corresponding plurality of level indicators selectively positionable thereacross.

FIG. 21 is a side elevation view in section of a twenty-first embodiment of a measuring cup or container, designated as measuring cup 2100. The measuring cup 2100 includes a peripheral wall 2102 and bottom 2104 defining a cup interior 2106. The wall 2102 has a generally frustoconical configuration and defines an internal surface 2101 having a plurality of steps 2108*a* through 2108*e* disposed circumferentially about the internal surface 2101 of the wall 2102. Each of the steps 2108*a* through 2108*e* defines a corresponding interior span, respectively 2109*a* through 2109*e* corresponding to different diameters in accordance with the frustoconical shape of the cup or container 2100. A corresponding series of thin, rigid level indicators are provided, each of the indicators having different lengths from one another to span the interior spans 2109*a* through 2109*e* across corresponding steps 2108*a* through 2108*e*. Two such level indicators 2110*b* and 2110*d* are shown in FIG. 21, having lengths spanning the corresponding spans 2109*b* and 2109*d* across the steps 2108*b* and 2108*d*. However, generally only a single one of the level indicators will be placed across the selected step and interior span of the container or cup 2100 to set the level to which the container 2100 is to be filled.

Figure 22:
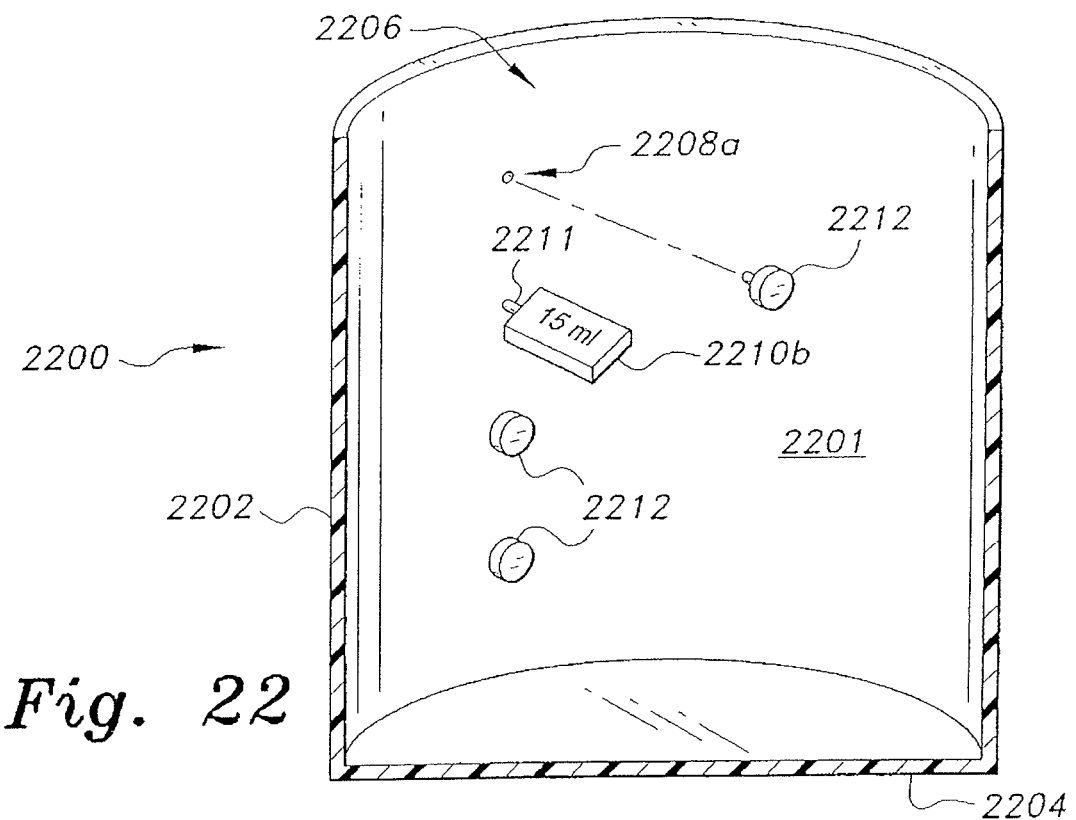
FIG. 22 is a perspective view in section of a twenty-second embodiment of a measuring cup according to the present invention, wherein the cup includes a plurality of selectively sealable ports therethrough and the level indicator has a pin selectively installable in the ports.
Figure 23:
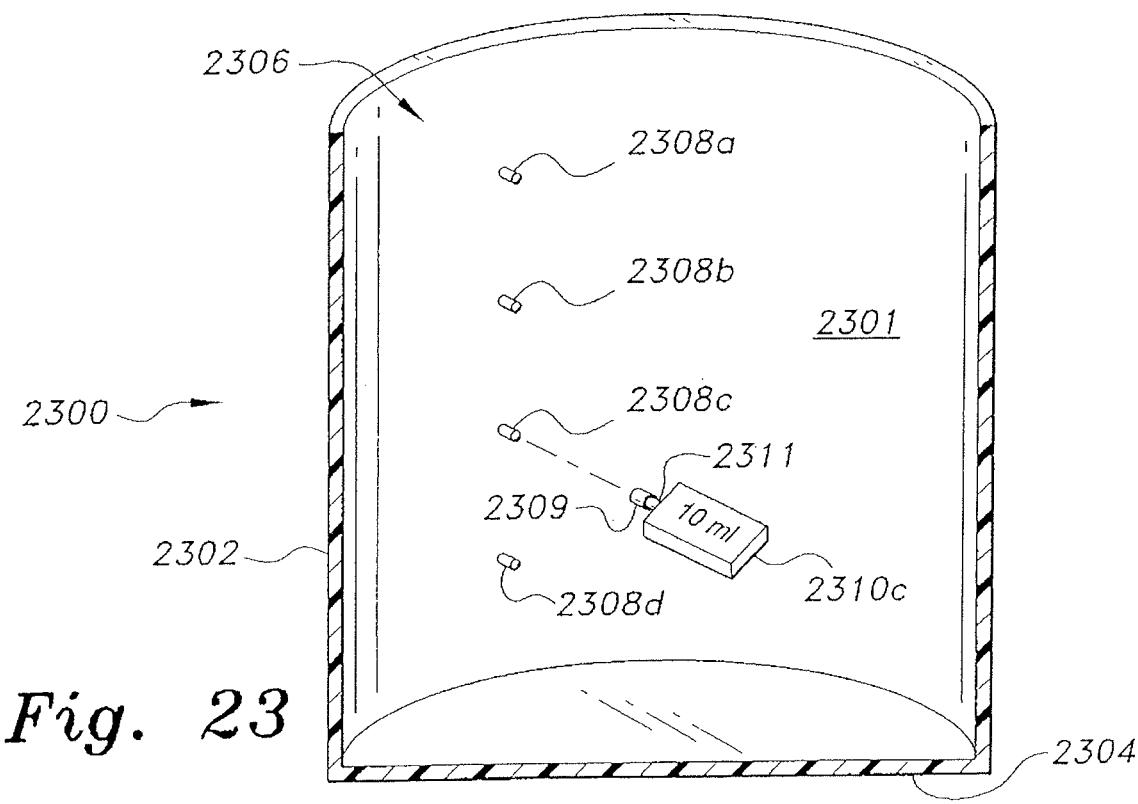
FIG. 23 is a perspective view in section of a twenty-third embodiment of a measuring cup according to the present invention, wherein the cup includes a plurality of pins therein and the level indicator has a socket selectively installable on the pins.

FIGS. 22 and 23 illustrate perspective views in section of additional embodiments of a measuring cup. The measuring cup 2200 of FIG. 22 includes a peripheral wall 2202 and a bottom 2204 defining a cup interior 2206. The interior surface 2201 of the wall 2202 includes a plurality of sockets or receptacles therein corresponding to different levels or volumes within the cup 2200, the uppermost receptacle 2208*a* being shown in FIG. 22. The sockets or receptacles provide level indicator attachment points for a corresponding number of level indicators. Each level indicator, e.g., the level indicator 2210*b* illustrated, comprises a thin, flat plate having an attachment arm or pin 2211 extending therefrom. The arm or pin inserts removably into the corresponding socket or receptacle inside the cup wall. The level indicators are preferably marked with a quantity or other unique property to indicate the corresponding level of fluid in the cup 2200 when the cup is filled to the level of the indicator. Unused level indicator attachment points, sockets or receptacles can be sealed with removable plugs 2212.

The measuring cup 2300 of FIG. 23 includes a peripheral wall 2302 and a bottom 2304 defining a cup interior 2306. The interior surface 2301 of the wall 2302 includes a plurality of pins 2308*a* through 2308*d* extending therefrom corresponding to different levels or volumes within the cup 2300. The pins provide level indicator attachment points for a corresponding number of level indicators. Each level indicator, e.g., the level indicator 2310*c* illustrated, comprises a thin, flat plate having an attachment socket 2309 extending from the distal end of an attachment arm 2311. The attachment socket 2309 fits over a selected one of the pins 2308*a* through 2308*d* to set the level indicator at the desired height corresponding to the level desired in the cup or container 2300. The level indicators are preferably marked with a quantity or other unique property to indicate the corresponding level of fluid in the cup 2300 when the cup is filled to the level of the indicator.

Figure 24:
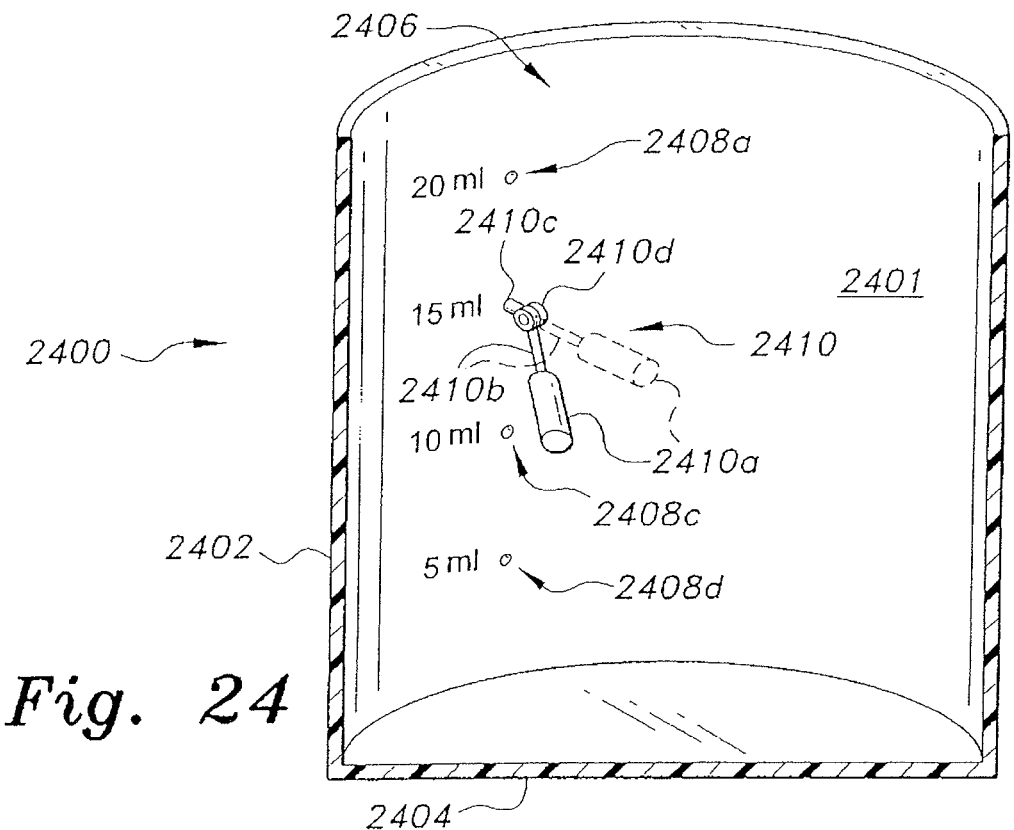
FIG. 24 is a perspective view in section of a twenty-fourth embodiment of a measuring cup according to the present invention, wherein the cup includes a plurality of sockets therein and the level indicator comprises a hinged float on a pin, the pin being selectively installed in one of the sockets.
Figure 25:
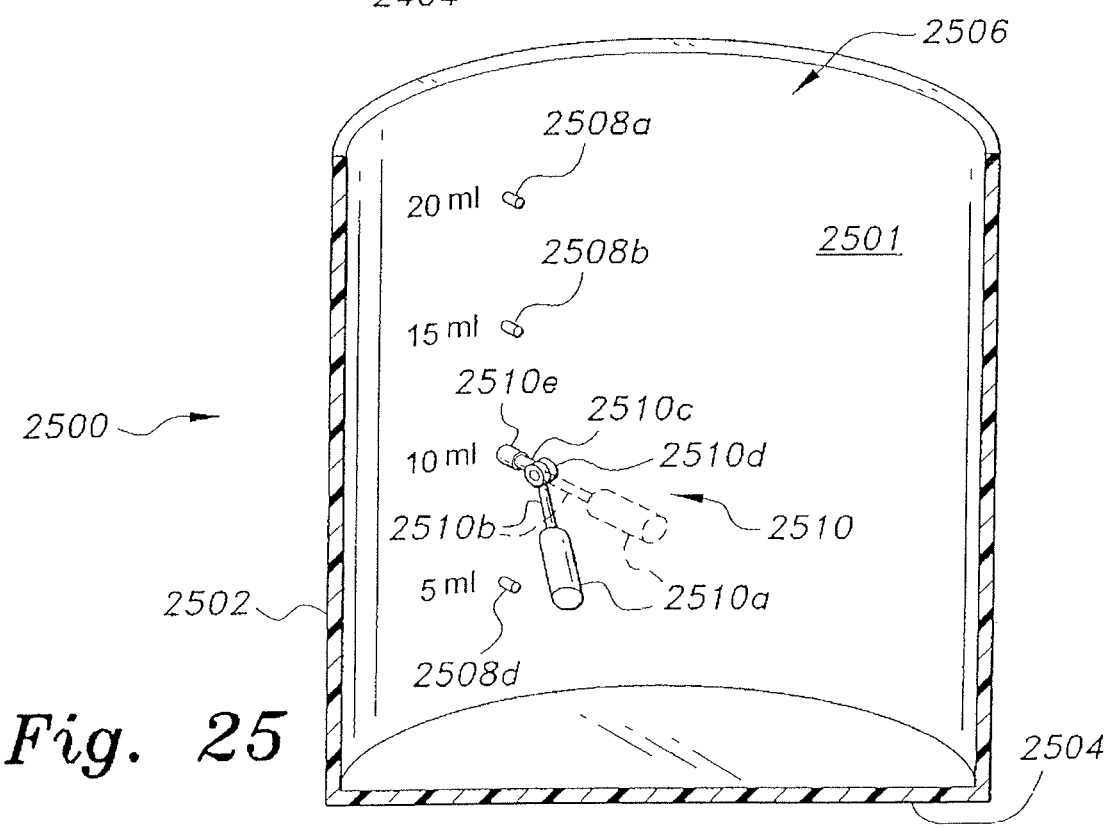
FIG. 25 is a perspective view in section of a twenty-fifth embodiment of a measuring cup according to the present invention, wherein the cup includes a plurality of pins therein and the level indicator comprises a hinged float on a socket, the socket being selectively installed on one of the pins.

FIGS. 24 and 25 illustrate additional embodiments of a measuring cup, wherein the level indicators comprise small buoyant floats. The measuring cup 2400 of FIG. 24 includes a peripheral wall 2402 and a bottom 2404 defining a cup interior 2406. The interior surface 2401 of the wall 2402 includes a plurality of sockets or receptacles therein corresponding to different levels or volumes within the cup 2400. Receptacles 2408a, 2408c, and 2408d are shown in FIG. 24. Quantity indication marks or labels can be provided adjacent corresponding sockets or receptacles, as shown. The sockets or receptacles 2408a, 2408c, etc., provide level indicator attachment points for a corresponding number of level indicators. Each level indicator, e.g., the level indicator 2410 illustrated, comprises a buoyant float 2410a having an arm 2410b extending therefrom. The arm 2410b is attached to a pin 2410c by a hinge or pivot 2410d. The pin 2410c is selectively and removably insertable into one of the sockets or receptacles 2408a, etc., in the inner surface 2401 of the cup wall 2402. The measuring cup 2400 is used by installing the pin 2410 of the level indicator float assembly 2410 in the selected receptacle or socket and filling the cup or container 2400 until the float 2410a rises to a level orientation.

The measuring cup 2500 of FIG. 25 includes a peripheral wall 2502 and a bottom 2504 defining a cup interior 2506. The interior surface 2501 of the wall 2502 includes a plurality of pins 2508a through 2508d extending therefrom (the pin 2508c is concealed by the attachment of the level indicator float assembly in FIG. 25) corresponding to different levels or volumes within the cup 2500. Quantity indication marks or labels can be provided adjacent corresponding pins, as shown. The pins 2508a through 2508d provide level indicator attachment points for a corresponding number of level indicators. Each level indicator, e.g., the level indicator 2510 illustrated, comprises a buoyant float 2510a having an arm 2510b extending therefrom. The arm 2510b is attached to an extension 2510c by a hinge or pivot 2510d. The distal end of the extension 2510c has a socket or receptacle 2510e extending therefrom. The socket or receptacle 2510e is selectively and removably installed onto one of the pins 2508a, etc., extending inward from the inner surface 2501 of the cup wall 2502. The measuring cup 2500 is used by installing the socket or receptacle 2510e of the level indicator float assembly 2510 onto the selected pin and filling the cup or container 2500 until the float 2510a rises to a level orientation.

Figure 26:
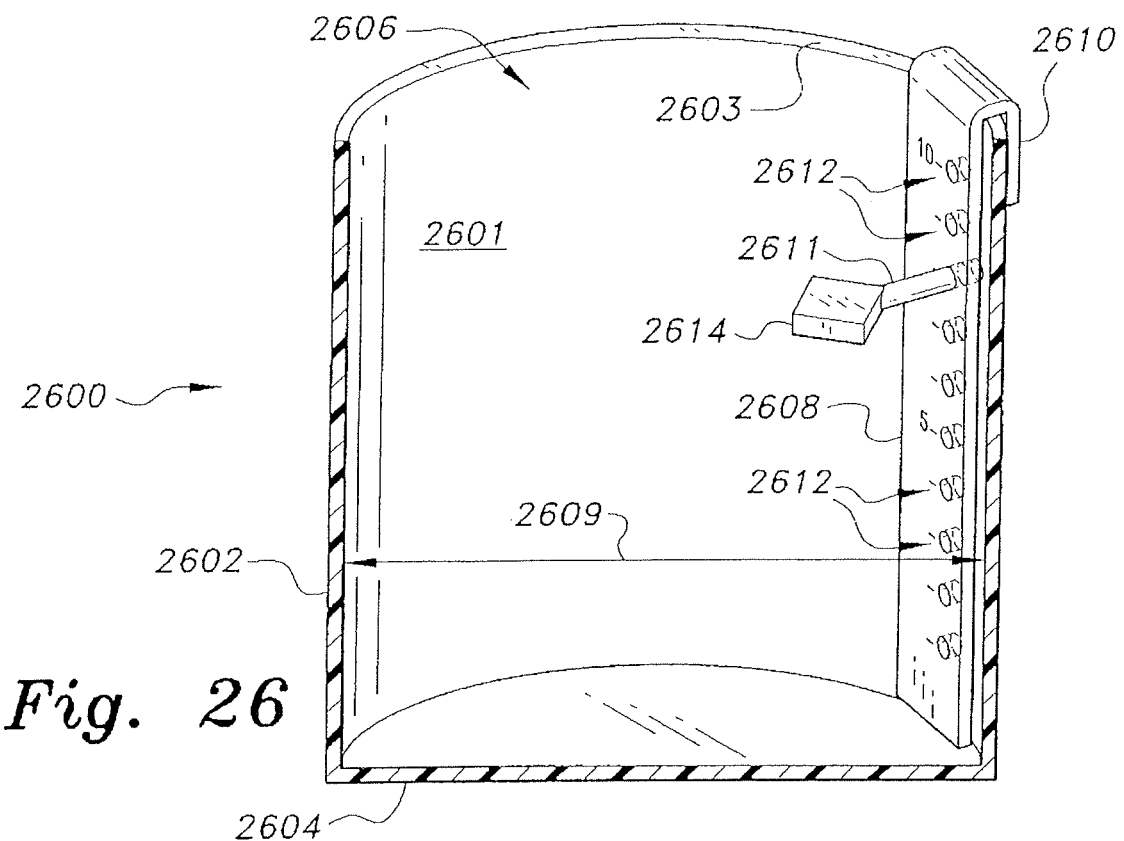
FIG. 26 is a perspective view of a twenty-sixth embodiment of a measuring cup according to the present invention, wherein the level indicator comprises a removable scale having a plurality of holes therein with a selectively installable pin and tab.
Figure 27:
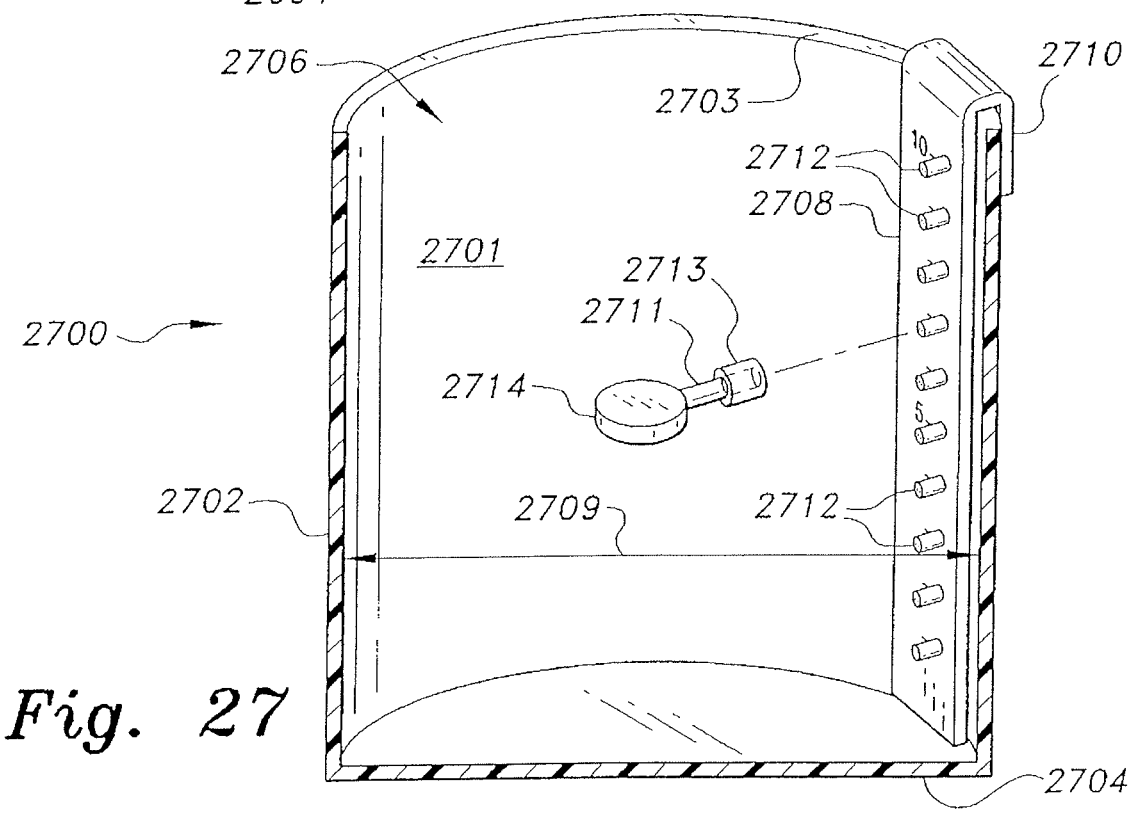
FIG. 27 is a perspective view of a twenty-seventh embodiment of a measuring cup according to the present invention, wherein the level indicator comprises a removable scale having a plurality of pins extending therefrom with a selectively installable socket and tab.

FIGS. 26 and 27 provide perspective views in section of two additional embodiments of a measuring cup in which a removable scale is installed within the cup immediately adjacent the cup wall. The measuring cup 2600 of FIG. 26 includes a peripheral wall 2602 and a bottom 2604 defining a cup interior 2606. The wall 2602 has an internal surface 2601 defining an interior span 2609. The wall has an upper rim 2603. The scale comprises an elongate bar 2608 having a clip 2610 at the upper end thereof, which is adapted to be removably clipped over the upper rim 2603 of the cup wall 2602 so that the bar 2608 extends downward into the cup interior 2606 adjacent to the internal surface 2601 of the wall 2602. The bar 2608 includes a plurality of level indicator attachment points comprising sockets or receptacles 2612 defined therein, which are disposed in a vertical array and correspond to various fluid levels in the cup 2600 when the bar 2608 is properly clipped to the rim 2603 of the cup wall 2602. A level indicator 2614 is provided for removable installation into a selected one of the level indicator attachment point sockets or receptacles 2612 of the bar 2608. The level indicator 2614 comprises a thin, flat plate having an attachment arm or pin 2611 extending therefrom. The arm or pin inserts removably into the corresponding socket or receptacle 2612 of the scale or bar 2608. The level indicator sockets or receptacles 2608 are preferably marked with quantities or other unique properties to indicate the corresponding level of fluid in the cup 2600 when the cup is filled to the level of the indicator.

The measuring cup 2700 of FIG. 27 includes a peripheral wall 2702 and a bottom 2704 defining a cup interior 2706. The wall 2702 has an internal surface 2701 defining an interior span 2709. The wall has an upper rim 2703. The scale comprises an elongate bar 2708 having a clip 2710 at the upper end thereof, which is adapted to be removably clipped over the upper rim 2703 of the cup wall 2702 so that the bar 2708 extends downward into the cup interior 2706 adjacent to the internal surface 2701 of the wall 2702. The bar 2708 includes a plurality level indicator attachment points comprising pins 2712 extending therefrom, which are disposed in a vertical array and correspond to various fluid levels in the cup 2700 when the bar 2708 is properly clipped to the rim 2703 of the cup wall 2702. A level indicator 2714 is provided for removable installation onto a selected one of the level indicator attachment pins 2712 of the bar 2708. The level indicator 2714 comprises a thin, flat plate having an attachment arm or pin 2711 extending therefrom and a socket or receptacle 2713 disposed upon the distal end of the arm or pin 2711. The socket or receptacle 2713 installs removably onto the corresponding pin 2712 of the scale or bar 2708. The level indicator sockets or receptacles 2708 are preferably marked with quantities or other unique properties to indicate the corresponding level of fluid in the cup 2700 when the cup is filled to the level of the indicator.

It is to be understood that the present invention is not limited to the embodiments described above, but encompasses any and all embodiments within the scope of the following claims.

We claim:

1. A measuring cup, comprising:
   a container having a peripheral wall, a bottom, and an interior; and
   at least one quantity indicator rod extending upward from the bottom of the container into the interior thereof, the at least one quantity indicator rod comprising a plurality of rod segments, wherein the at least one quantity indicator rod comprises a single quantity indicator rod, the rod segments selectively connecting to one another, the rod segments having lengths defining specific predetermined volumes within the container interior when the rod segments are connected to one another.

2. The measuring cup according to claim 1, wherein the plurality of rod segments includes:
   an uppermost rod segment; and
   a level indicator tab disposed upon the uppermost rod segment.

3. The measuring cup according to claim 1, wherein the at least one quantity indicator rod comprises a single threaded quantity indicator rod, the measuring cup further comprising a level indicator tab having a threaded passage therethrough, the level indicator tab being threadably and adjustably disposed upon the indicator rod.

4. The measuring cup according to claim 1, wherein the at least one quantity indicator rod comprises a single indicator rod having a circular cross section, the measuring cup further comprising:
- a flange extending radially from the indicator rod, the flange having a plurality of notches disposed therein; and
- a level indicator tab, the tab having a passage disposed therethrough, the passage being congruent with the circular cross section and flange of the indicator rod, the tab engaging a selected one of the notches of the flange when installed upon the indicator rod, aligned with the selected one of the notches, and rotated about the indicator rod.

5. The measuring cup according to claim 1, wherein the at least one quantity indicator rod comprises a single indicator rod having a circular cross section and a plurality of notches disposed therein, the measuring cup further comprising a level indicator tab, the tab having a slot disposed therein, the slot of the tab selectively engaging one of the notches of the indicator rod when the tab is installed upon the rod.

6. A measuring cup, comprising:
- a container having a peripheral wall, a bottom, and an interior; and
- at least one quantity indicator rod extending upward from the bottom of the container into the interior thereof, the at least one quantity indicator rod comprising a plurality of rod segments, wherein the at least one quantity indicator rod comprises a single indicator rod having a circular cross section, the measuring cup further comprising:
  - a flange extending radially from the indicator rod, the flange having a plurality of notches disposed therein; and
  - a level indicator tab, the tab having a passage disposed therethrough, the passage being congruent with the circular cross section and flange of the indicator rod, the tab engaging a selected one of the notches of the flange when installed upon the indicator rod, aligned with the selected one of the notches, and rotated about the indicator rod.

* * * * *